(12) United States Patent
Matsunaga et al.

(10) Patent No.: US 10,425,693 B2
(45) Date of Patent: Sep. 24, 2019

(54) CONTENT REPRODUCTION SYSTEM, VIDEO RECORDING APPARATUS, TERMINAL APPARATUS, AND CONTENT REPRODUCTION METHOD

(71) Applicant: Panasonic Intellectual Property Management Co., Ltd., Osaka (JP)

(72) Inventors: Shigeki Matsunaga, Hyogo (JP); Shunsuke Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 15/547,180

(22) PCT Filed: Jan. 28, 2016

(86) PCT No.: PCT/JP2016/000424
§ 371 (c)(1),
(2) Date: Jul. 28, 2017

(87) PCT Pub. No.: WO2016/129224
PCT Pub. Date: Aug. 18, 2016

(65) Prior Publication Data
US 2018/0242046 A1    Aug. 23, 2018

(30) Foreign Application Priority Data
Feb. 13, 2015 (JP) .................. 2015-026992

(51) Int. Cl.
*H04N 21/472* (2011.01)
*G06F 13/00* (2006.01)
(Continued)

(52) U.S. Cl.
CPC ....... *H04N 21/47217* (2013.01); *G06F 13/00* (2013.01); *H04N 21/23113* (2013.01);
(Continued)

(58) Field of Classification Search
CPC ....... H04N 21/47217; H04N 21/23113; H04N 21/254; H04N 21/258; H04N 21/26258;
(Continued)

(56) References Cited

U.S. PATENT DOCUMENTS

2005/0091690 A1* 4/2005 Delpuch .............. G11B 27/005
725/88
2005/0213931 A1 9/2005 Kudara
(Continued)

FOREIGN PATENT DOCUMENTS

EP      2587798 A1     5/2013
JP    2006-301877     11/2006
(Continued)

OTHER PUBLICATIONS

The Extended European Search Report dated Oct. 11, 2017 for the related European Patent Application No. 16748869.1.
(Continued)

*Primary Examiner* — Thai Q Tran
*Assistant Examiner* — Sunghyoun Park
(74) *Attorney, Agent, or Firm* — McDermott Will & Emery LLP

(57) ABSTRACT

A content reproduction system includes: a video recording apparatus for recording a content item; and a terminal apparatus for reproducing the content item. The terminal apparatus includes: a display; an acceptor that accepts an operation of a user; a list storage that stores a bookmark list; a managing controller; a display controller; and a reproduction controller. In a case of having been notified of reproduction position update information from the reproduction controller, the managing controller updates the reproduction position information, which indicates a reproduction position of the content item and is included in the bookmark list, based on the reproduction position update information.

10 Claims, 25 Drawing Sheets

(51) Int. Cl.

| | |
|---|---|
| *H04N 21/258* | (2011.01) |
| *H04N 21/462* | (2011.01) |
| *H04N 21/414* | (2011.01) |
| *H04N 21/431* | (2011.01) |
| *H04N 21/433* | (2011.01) |
| *H04N 21/482* | (2011.01) |
| *H04N 21/231* | (2011.01) |
| *H04N 21/254* | (2011.01) |
| *H04N 21/262* | (2011.01) |
| *H04N 21/4335* | (2011.01) |
| *H04N 21/435* | (2011.01) |
| *H04N 21/41* | (2011.01) |
| *H04N 21/4227* | (2011.01) |
| *H04N 21/432* | (2011.01) |
| *H04N 21/442* | (2011.01) |
| *H04N 21/845* | (2011.01) |

(52) U.S. Cl.
CPC ......... *H04N 21/254* (2013.01); *H04N 21/258* (2013.01); *H04N 21/26258* (2013.01); *H04N 21/4126* (2013.01); *H04N 21/4135* (2013.01); *H04N 21/41407* (2013.01); *H04N 21/4227* (2013.01); *H04N 21/431* (2013.01); *H04N 21/435* (2013.01); *H04N 21/4325* (2013.01); *H04N 21/4334* (2013.01); *H04N 21/4335* (2013.01); *H04N 21/44222* (2013.01); *H04N 21/462* (2013.01); *H04N 21/4622* (2013.01); *H04N 21/47202* (2013.01); *H04N 21/47214* (2013.01); *H04N 21/482* (2013.01); *H04N 21/4825* (2013.01); *H04N 21/8455* (2013.01)

(58) Field of Classification Search
CPC ........... H04N 21/4126; H04N 21/4135; H04N 21/41407; H04N 21/4227; H04N 21/431
See application file for complete search history.

(56) References Cited

U.S. PATENT DOCUMENTS

| | | |
|---|---|---|
| 2006/0233524 A1 | 10/2006 | Masuo |
| 2007/0047909 A1 | 3/2007 | Toyama et al. |
| 2008/0107058 A1* | 5/2008 | Yang .................. H04N 7/17318 370/312 |
| 2012/0025409 A1* | 2/2012 | Lee ....................... F42B 33/025 264/3.4 |
| 2012/0030554 A1* | 2/2012 | Toya .................. H04N 7/17318 715/206 |
| 2012/0110424 A1 | 5/2012 | Kim |
| 2012/0114313 A1 | 5/2012 | Phillips et al. |
| 2013/0054742 A1 | 2/2013 | Tsuji et al. |
| 2013/0167168 A1* | 6/2013 | Ellis .................. H04N 5/44543 725/12 |
| 2017/0295395 A1 | 10/2017 | Smith et al. |

FOREIGN PATENT DOCUMENTS

| | | |
|---|---|---|
| JP | 2007-067702 A | 3/2007 |
| JP | 2008-085936 A | 4/2008 |
| JP | 2013-045495 A | 3/2013 |
| JP | 2013-157073 | 8/2013 |

OTHER PUBLICATIONS

The Extended European Search Report dated Oct. 11, 2017 for the related European Patent Application No. 16748872.5.
International Search Report of PCT application No. PCT/JP2016/000424 dated Apr. 26, 2016.
Final Office Action issued in related U.S. Appl. No. 15/547,977 dated Oct. 11, 2018.
Office Action issued in U.S. Appl. No. 15/547,977 dated Jun. 29, 2018.

* cited by examiner

FIG. 4

| Title | URL | Recording time | Reproduction position |
|---|---|---|---|
| Program A | http://A | 1:30:00 | 0:10:00 |
| Program B | http://B | 0:30:00 | 0:12:00 |
| Program C | http://C | 2:00:00 | 0:00:00 |
| . | . | . | . |
| . | . | . | . |
| . | . | . | . |

| Title | URL | Recording time | Reproduction position |
|---|---|---|---|
| - | - | - | - |

Register program A in bookmark list in procedure A (or procedure B)

(b)

| Title | URL | Recording time | Reproduction position |
|---|---|---|---|
| Program A | http://A | 1:30:00 | 0:00:00 |

Register program B in bookmark list in procedure C (c)

| Title | URL | Recording time | Reproduction position |
|---|---|---|---|
| Program A | http://A | 1:30:00 | 0:00:00 |
| Program B | http://B | 0:30:00 | 0:12:00 |

Register program C in bookmark list in procedure D (d)

| Title | URL | Recording time | Reproduction position |
|---|---|---|---|
| Program A | http://A | 1:30:00 | 0:00:00 |
| Program B | http://B | 0:30:00 | 0:12:00 |
| Program C | http://C | 2:00:00 | 0:00:00 |

Reproduce program A, stop reproduction of program A halfway (e)

| Title | URL | Recording time | Reproduction position |
|---|---|---|---|
| Program A | http://A | 1:30:00 | 0:10:00 |
| Program B | http://B | 0:30:00 | 0:12:00 |
| Program C | http://C | 2:00:00 | 0:00:00 |

End reproduction of program B (f)

| Title | URL | Recording time | Reproduction position |
|---|---|---|---|
| Program A | http://A | 1:30:00 | 0:10:00 |
| Program C | http://C | 2:00:00 | 0:00:00 |

CONTENT REPRODUCTION SYSTEM, VIDEO RECORDING APPARATUS, TERMINAL APPARATUS, AND CONTENT REPRODUCTION METHOD

This application is a U.S. national stage application of the PCT International Application No. PCT/JP2016/000424 filed on Jan. 28, 2016, which claims the benefit of foreign priority of Japanese patent application 2015-026992 filed on Feb. 13, 2015, the contents all of which are incorporated herein by reference.

TECHNICAL FIELD

The present disclosure relates to a content reproduction system, a video recording apparatus, a terminal apparatus, and a content reproduction method.

BACKGROUND ART

Patent Literature (PTL) 1 discloses an information management apparatus and an information management method.

A content reproduction system is known, which includes: a server for distributing a content item; and a terminal apparatus for reproducing the content item distributed (for example, refer to PTL 1). In such a conventional content reproduction system, an application for reproducing the content item is implemented in the terminal apparatus. This application has a bookmark function for registering the content item in a bookmark list. For example, this content reproduction system is capable of following operations.

For example, it is assumed that a reception state of a radio wave is deteriorated in a case where a user reproduces the content item on the terminal apparatus. In this case, the user can perform an operation of registering the content item in the bookmark list in the terminal apparatus. Thereafter, for example, in a case where the reception state of the radio wave is improved, the user performs an operation of selecting the content item, which is registered in the bookmark list, in a bookmark list screen displayed on the terminal apparatus, and can thereby reproduce the selected content item from a head of the content item.

CITATION LIST

Patent Literature

PTL 1: Unexamined Japanese Patent Publication No. 2006-301877

SUMMARY

The present disclosure provides a content reproduction system, a video recording apparatus, a terminal apparatus, and a content reproduction method, which are capable of enhancing convenience for the user in a case where the user reproduces the content item in the terminal apparatus.

The content reproduction system in the present disclosure includes: a video recording apparatus for recording a content item; and a terminal apparatus for reproducing the content item. In the content reproduction system, the video recording apparatus includes: a recorder; a content storage; a content information storage; a content distributor; and a content information distributor. The recorder records the content item in the content storage. The content storage stores the content item in accordance with an instruction from the recorder. The content information storage stores content information regarding the recorded content item. The content distributor distributes the content item, which is stored in the content storage, to the terminal apparatus. The content information distributor distributes the content information, which is stored in the content information storage, to the terminal apparatus. The terminal apparatus includes: a display; an acceptor that accepts an operation of a user; a list storage; a managing controller; a display controller; and a reproduction controller. The list storage stores a bookmark list. The bookmark list includes content information including reproduction position information indicating a reproduction position of the content item. The managing controller manages the bookmark list. The display controller allows the display to display a bookmark list screen indicating a list of the content information included in the bookmark list. In a case where the acceptor has accepted a user's operation of reproducing the content item, the reproduction controller starts reproduction of the content item from the reproduction position indicated by the reproduction position information. Moreover, in a case where the acceptor has accepted a user's operation of stopping the reproduction of the content item, the reproduction controller stops the reproduction of the content item, and notifies the managing controller of reproduction position update information indicating the updated reproduction position of the content item. In a case of having been notified of the reproduction position update information from the reproduction controller, the managing controller of the terminal apparatus updates the reproduction position information, which is included in the bookmark list, based on the reproduction position update information. Moreover, in a case of having determined that the reproduction of the content item is finished, the managing controller deletes content information regarding the content item from the bookmark list.

The content reproduction system in the present disclosure can enhance the convenience for the user in the case where the user reproduces the content item in the terminal apparatus.

BRIEF DESCRIPTION OF DRAWINGS

FIG. 4 is a diagram schematically showing an example of a bookmark list managed in the server in the first exemplary embodiment.

FIG. 12 is a diagram schematically showing an example of a management method of the bookmark list by a managing controller in the first exemplary embodiment.

DESCRIPTION OF EMBODIMENTS

Figure 1:
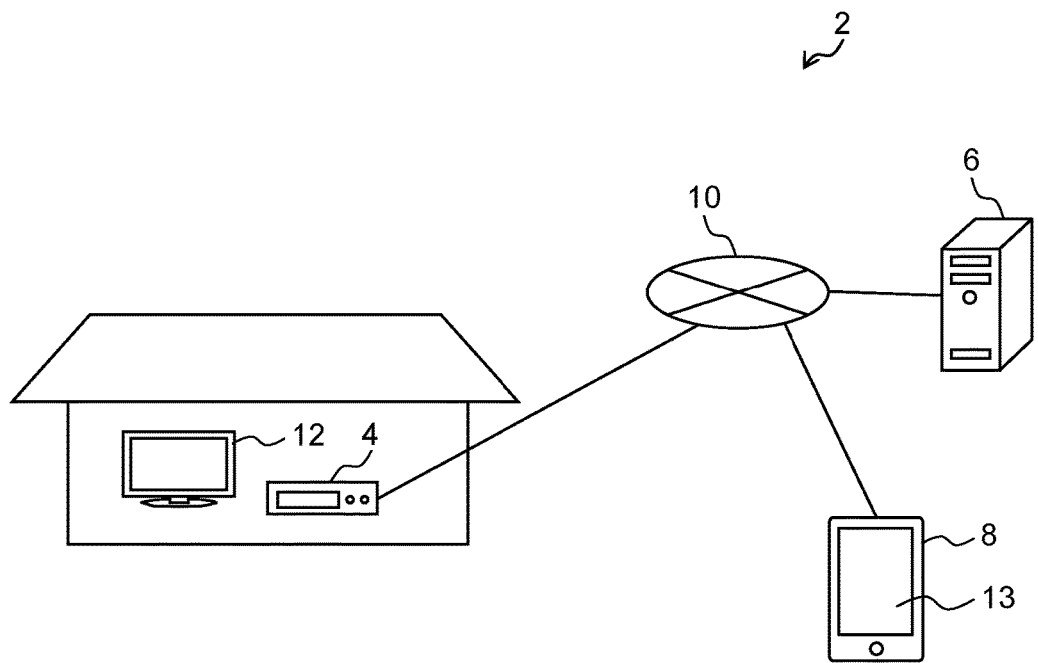
FIG. 1 is a diagram schematically showing a configuration example of a content reproduction system in a first exemplary embodiment.

Hereinafter, exemplary embodiments will be described in detail with reference to the drawings as appropriate. However, a description more in detail than necessary is omitted in some case. For example, a detailed description of a well-known item, a duplicate description of substantially the same configuration, and the like are omitted in some case. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Note that the respective drawings are schematic diagrams, and are not necessarily exactly illustrated. Furthermore, in the respective drawings, the same reference numerals are assigned to substantially the same constituent elements, and a duplicate description is omitted or simplified in some case.

First Exemplary Embodiment

Hereinafter, a first exemplary embodiment will be described with reference to FIG. 1 to FIG. 12.

[1-1. Overall Configuration of Content Reproduction System]

First, a description is made of an overall configuration of content reproduction system 2 in the first exemplary embodiment with reference to FIG. 1.

FIG. 1 is a diagram schematically showing a configuration example of content reproduction system 2 in the first exemplary embodiment.

As shown in FIG. 1, content reproduction system 2 includes: recorder (video recording apparatus) 4; server 6; and smart phone 8. Recorder 4, server 6 and smart phone 8 are communicable with one another via Internet 10. Smart phone 8 is an example of a terminal apparatus.

Note that these instruments may be connected to one another through a communication network other than Internet 10, or may be connected to one another by a network in which Internet 10 and the other communication network are mixed with each other.

Recorder 4 is an example of a video recording apparatus for recording a content item (for example, a moving image content item such as a broadcast program). Recorder 4 is installed in a user's house. Note that recorder 4 may be connected to television receiver 12, which is installed in the user's house, by a cable and the like.

Server 6 is a server for managing a bookmark list, and so on. For example, server 6 is a cloud server installed outside the user's house. The bookmark list will be described later.

Smart phone 8 is an example of a terminal apparatus for reproducing the content item. Smart phone 8 is used by the user in the user's house or outside the user's house. Smart phone 8 has display 13 configured by including a touch panel. Moreover, an application for reproducing the content item is implemented in smart phone 8. In this way, in smart phone 8, the content item reproduced by the application is displayed on display 13.

Note that the terminal apparatus for reproducing the content item is not limited to smart phone 8, and may be a cellular phone, a tablet terminal, a personal computer or the like.

In content reproduction system 2 mentioned above, the user operates smart phone 8, and can thereby view the content item, which is recorded in recorder 4, outside the user's house for example. Hereinafter, an operation that the user operates smart phone 8 is also referred to as "user's operation".

[1-2. Functional Configuration of Recorder]

Figure 2:
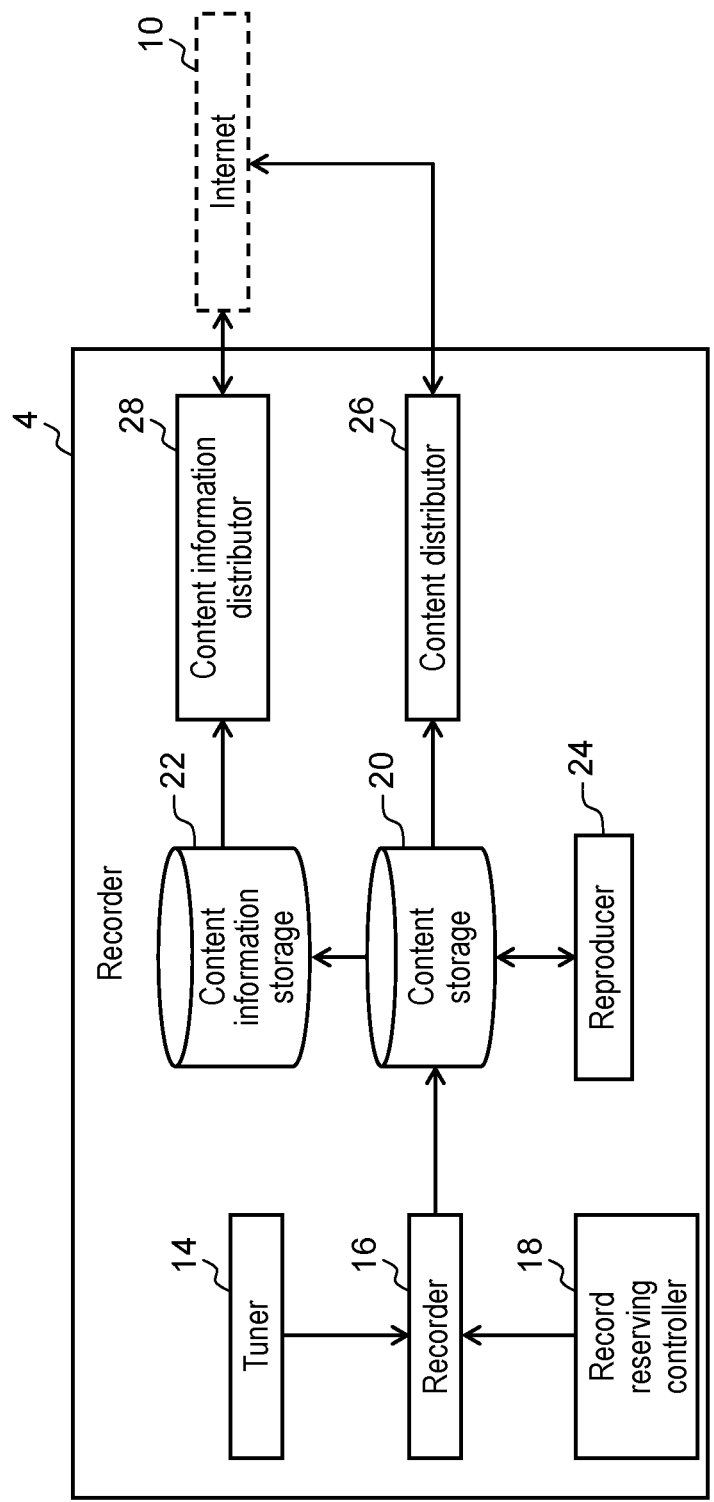
FIG. 2 is a block diagram schematically showing an example of a functional configuration of a recorder in the first exemplary embodiment.

Next, a description is made of a functional configuration of recorder 4 with reference to FIG. 2.

FIG. 2 is a block diagram schematically showing an example of the functional configuration of recorder 4 in the first exemplary embodiment.

As shown in FIG. 2, recorder 4 includes: tuner 14; recorder 16; record reserving controller 18; content storage 20; content information storage 22; reproducer 24; content distributor 26; and content information distributor 28.

Tuner 14 is a tuner for receiving a broadcast program or the like (hereinafter, referred to as "content item") broadcast by terrestrial digital broadcasting, satellite broadcasting or the like.

Recorder 16 allows content storage 20 to store the content item received by tuner 14. Hereinafter, this operation is referred to as "recording". That is, recorder 16 records the content item in content storage 20.

In order to record a content item, of which recording is reserved by the user, record reserving controller 18 allows recorder 16 to execute the recording of the content item, which is thus corresponding to recording reservation, by using an EPG (Electronic Program Guide).

Content storage 20 stores the content item as a recording target in accordance with an instruction from recorder 16.

Content information storage 22 stores information regarding the content item stored in content storage 20 (hereinafter, this information is referred to as "content information"). Note that the content information stored in content information storage 22 is, for example, data regarding a title, recording date and time, recording time and the like of the content item.

Note that each of content storage 20 and content information storage 22 may be composed of a hard disk drive (not shown) or the like, which is built in recorder 4.

Reproducer 24 reproduces the content item recorded in content storage 20 by recorder 16. Specifically, reproducer 24 reads the content item from content storage 20 and reproduces the content item, and outputs the reproduced content item to television receiver 12.

Content distributor 26 distributes the content item, which is stored in content storage 20, to smart phone 8 via Internet 10.

Content information distributor 28 distributes the content information, which is stored in content information storage 22, to server 6 via Internet 10.

[1-3. Functional Configuration of Server]

Figure 3:
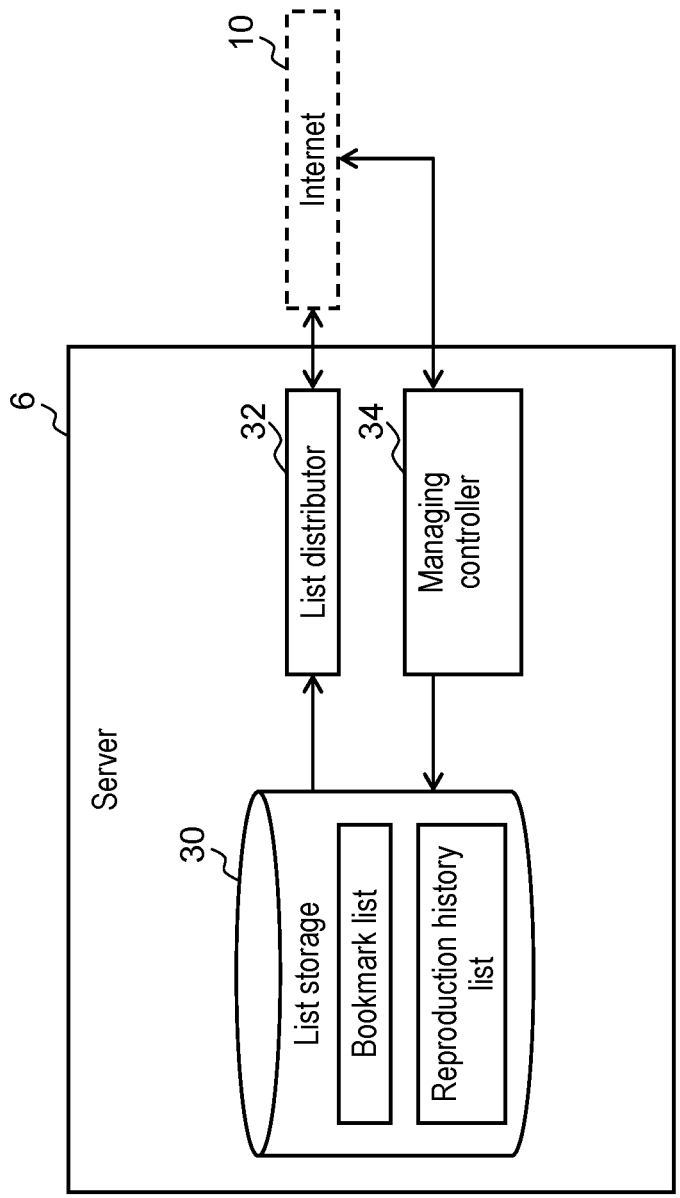
FIG. 3 is a block diagram schematically showing an example of a functional configuration of a server in the first exemplary embodiment.

Next, a description is made of a configuration (functional configuration) regarding functions of server 6 with reference to FIG. 3 and FIG. 4.

FIG. 3 is a block diagram schematically showing an example of a functional configuration of server 6 in the first exemplary embodiment.

FIG. 4 is a diagram schematically showing an example of the bookmark list managed in server 6 in the first exemplary embodiment.

As shown in FIG. 3, server 6 includes: list storage 30; list distributor 32; and managing controller 34.

List storage 30 stores the bookmark list and a reproduction history list. The bookmark list is data indicating a list of the content information regarding content items corresponding to the user's operation for registering the content items in the bookmark list. For example, this data is data of a table format. That is, the bookmark list includes the content information for each of the content items registered in the bookmark list. Note that the user's operation for registering the content items in the bookmark list will be described later. Note that, in this exemplary embodiment, "to register the content item in the bookmark list" has the same meaning as to add content information regarding the content item to the content list.

As shown in FIG. 4, the content information included in the bookmark list is, for example, data regarding a title, URL (Uniform Resource Locator), recording time, reproduction position and the like of the content item.

For example, the title is a broadcast program name such as "Program A".

The URL is an identifier for identifying the content item. The URL is data, for example, such as "http://A", which indicates a position of the content item on Internet 10. Note that, in place of the URL, for example, a broadcasting event ID or the like, which is assigned for each of the content items, may be used.

The recording time is a total reproduction time from a head of the content item to a terminal end of the content item, for example, such as "1:30:00 (1 hour 30 minutes 00 second)".

The reproduction position is data indicating a position (for example, "0:10:00 (0 hour 10 minutes 00 second)"), where the reproduction of the content item is stopped at a previous content item reproduction time, within a range from the head of the content item to the terminal end of the content item (hereinafter, the data is also referred to as "reproduction position information"). Note that, in a case where the content item is not reproduced until the content item is registered in the bookmark list, the reproduction position of the content item becomes "0:00:00 (0 hour 00 minute 00 second)".

Note that the content information included in the bookmark list may include a recording date and time, content detail information and the like as well as the title, URL, recording time and reproduction position of the content, which are mentioned above.

The reproduction history list (not shown) is data indicating a list of content information regarding content items of which reproduction is finished. Note that "content items of which reproduction is finished" refers to content items, in each of which the reproduction is performed to the terminal end. For example, the content information included in the reproduction history list is data regarding the title, URL, recording date and time, recording time, reproduction finishing date and time and the like of the content item.

List distributor 32 distributes the bookmark list and the reproduction history list, which are stored in list storage 30, to smart phone 8 via Internet 10.

Managing controller 34 communicates with recorder 4 and smart phone 8 via Internet 10, and thereby manages the bookmark list and the reproduction history list, which are stored in list storage 30. Such management will be described later.

[1-4. Functional Configuration of Smart Phone]

Figure 5:
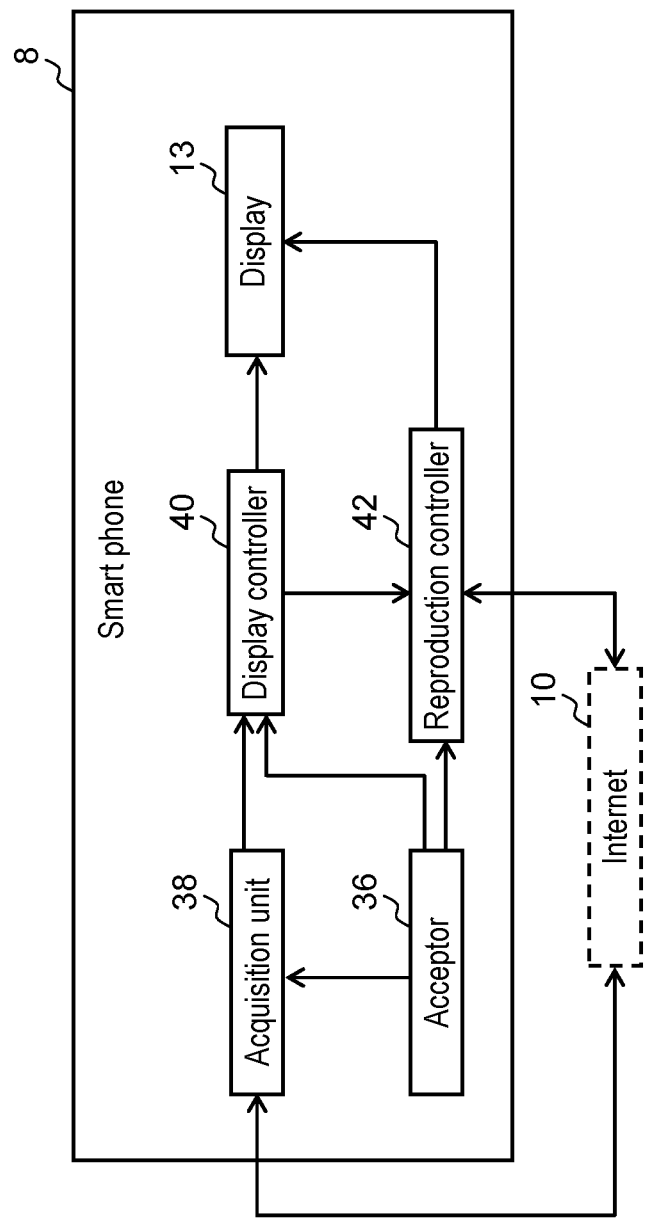
FIG. 5 is a block diagram schematically showing an example of a functional configuration of a smart phone in the first exemplary embodiment.
Figure 6:
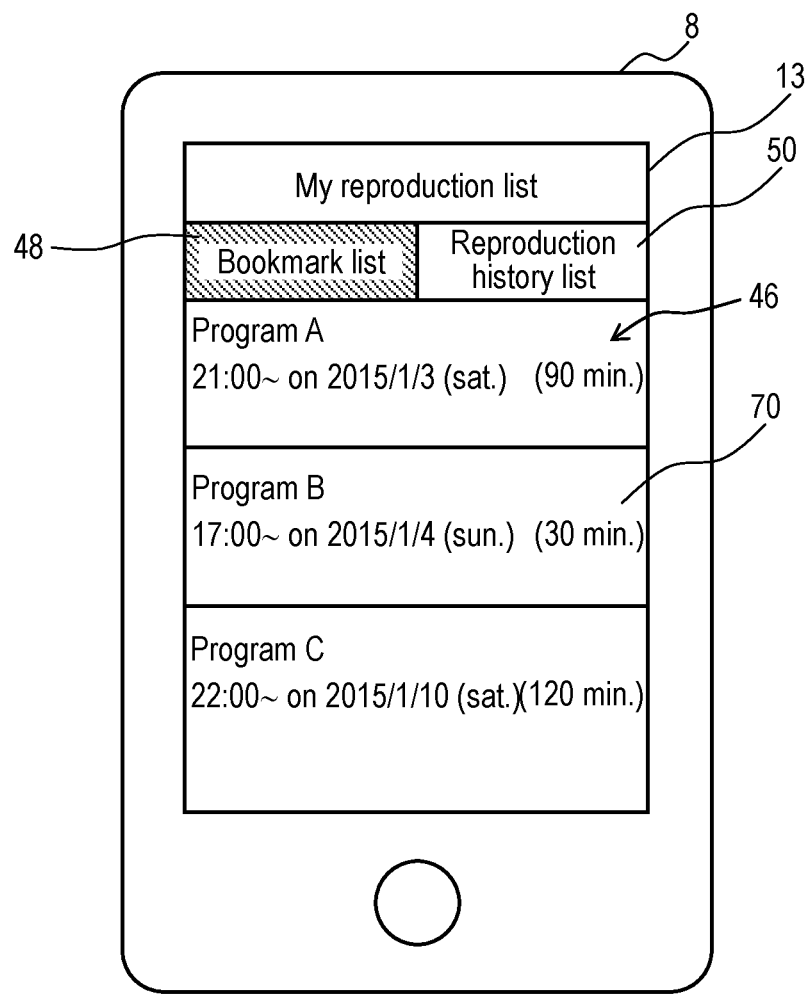
FIG. 6 is a diagram showing an example of a bookmark list screen displayed on the smart phone in the first exemplary embodiment.
Figure 7:
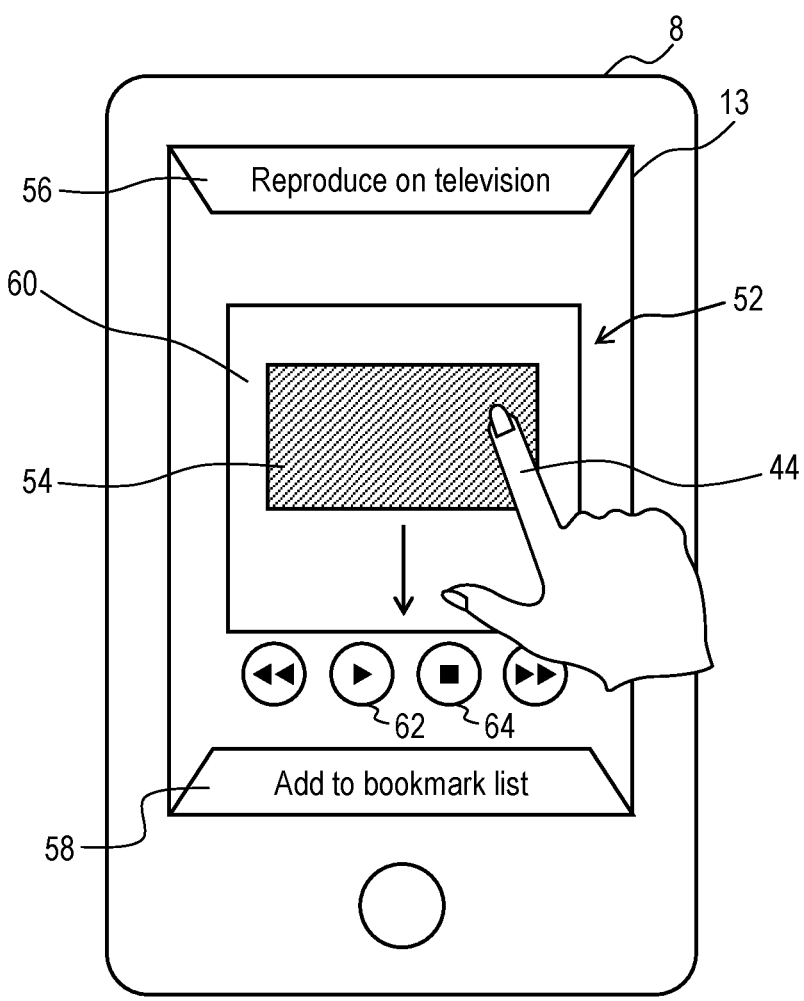
FIG. 7 is a diagram showing an example of a reproduction screen displayed on the smart phone in the first exemplary embodiment.

Next, a description is made of a functional configuration of smart phone 8 with reference to FIG. 5 to FIG. 7.

FIG. 5 is a block diagram schematically showing an example of a functional configuration of smart phone 8 in the first exemplary embodiment.

FIG. 6 is a diagram showing an example of bookmark list screen 46 displayed on smart phone 8 in the first exemplary embodiment.

FIG. 7 is a diagram showing an example of reproduction screen 52 displayed on smart phone 8 in the first exemplary embodiment.

As shown in FIG. 5, smart phone 8 includes: display 13; acceptor 36; acquisition unit 38; display controller 40; and reproduction controller 42.

Acceptor 36 accepts a user's operation (for example, a tap operation, a swipe operation, or the like) by finger 44 (refer to FIG. 7) of the user on display 13 provided with the touch panel.

Acquisition unit 38 acquires the bookmark list and the reproduction history list, which are distributed from server 6 via Internet 10.

Display controller 40 controls a display content of display 13. Specifically, display controller 40 allows display 13 to display bookmark list screen 46 based on the bookmark list acquired by acquisition unit 38. As an example is shown in FIG. 6, bookmark list screen 46 is a screen on which a list of the content information included in the bookmark list is displayed. On bookmark list screen 46, the title, recording date and time, recording time and the like of each of the content items registered in the bookmark list, are displayed for each of the content items.

Moreover, display controller 40 allows display 13 to display a reproduction history list screen (not shown) based on the reproduction history list acquired by acquisition unit 38. The reproduction history list screen is a screen indicating the list of the content information regarding the content items of which reproduction is finished. On the reproduction history list screen, the title, recording date and time, recording time, reproduction finishing date and time and the like of each of the content items registered in the bookmark list, are displayed for each of the content items.

For example, it is assumed that the user has performed a user's operation of tapping, by finger 44, tab 48 (bookmark list) or tab 50 (reproduction history list), which is disposed on an upper end portion of bookmark list screen 46 as shown in FIG. 6. When the user's operation is accepted by acceptor 36, an instruction signal that is based on the user's operation is sent from acceptor 36 to display controller 40. Hereinafter, the instruction signal is also simply referred to as "instruction". Display controller 40 controls display 13 based on the instruction. In this way, a display screen of display 13 is switched to bookmark list screen 46 or the reproduction history list screen (not shown).

Moreover, display controller 40 controls a GUI (Graphical User Interface) displayed on display 13. For example, it is assumed that, as shown in FIG. 7, in a state where reproduction screen 52 for reproducing the content item is displayed on display 13, the user has performed a user's operation of continuously touching (so-called long-pressing) reproduction screen 52 for a predetermined time (for example, 1.5 seconds) by finger 44. When the user's operation is accepted by acceptor 36, an instruction that is based on the user's operation is sent from acceptor 36 to display controller 40, display controller 40 controls display 13 based on the instruction, and display 13 displays icon 54 on reproduction screen 52 in a superimposing manner. At this time, display controller 40 further controls display 13 to display menu 56 ("Reproduce on Television") on an upper end portion of reproduction screen 52, and in addition, controls display 13 to display menu 58 ("Add to Bookmark List") on a lower end portion of reproduction screen 52. Note that menu 56 is a menu for reproducing a content item under reproduction on television receiver 12. Menu 58 is a menu for registering the content under reproduction in the bookmark list. Reproduction screen 52 will be described later.

Moreover, it is assumed that the user has performed a user's operation of swiping finger 44 on display 13 in a predetermined direction (direction directed toward menu 56 or direction directed toward menu 58) from the state where the user had continuously touched reproduction screen 52 by finger 44 for the predetermined time. When the user's operation is accepted by acceptor 36, an instruction that is based on the user's operation is sent from acceptor 36 to display controller 40, display controller 40 controls display 13 based on the instruction, and moves icon 54 in such a swiping direction.

Reproduction controller 42 controls the reproduction of the content item distributed from recorder 4 via Internet 10. In a case of reproducing the content item, reproduction controller 42 allows display 13 to display reproduction screen 52 as shown in FIG. 7. On a center portion of reproduction screen 52, display area 60 on which the reproduced content item is displayed is disposed. On a lower side of display area 60, a variety of buttons such as reproduction button 62 and stop button 64 is disposed.

For example, it is assumed that the user has performed a user's operation of tapping reproduction button 62 by finger 44. When the user's operation, that is, the user's operation of reproducing the content item is accepted by acceptor 36, an instruction that is based on the user's operation is sent from acceptor 36 to reproduction controller 42, and reproduction controller 42 starts to reproduce the content item based on the instruction. Then, the reproduced content item is displayed on display area 60.

Moreover, it is assumed that the user has performed a user's operation of tapping stop button 64 by finger 44. When the user's operation, that is, the user's operation of stopping the reproduction of the content item is accepted by acceptor 36, an instruction that is based on the user's operation is sent from acceptor 36 to reproduction controller 42, and reproduction controller 42 stops the reproduction of the content item based on the instruction.

[1-5. Operations of Content Reproduction System]

Next, operations of content reproduction system 2 will be described with reference to FIG. 8.

Figure 8:
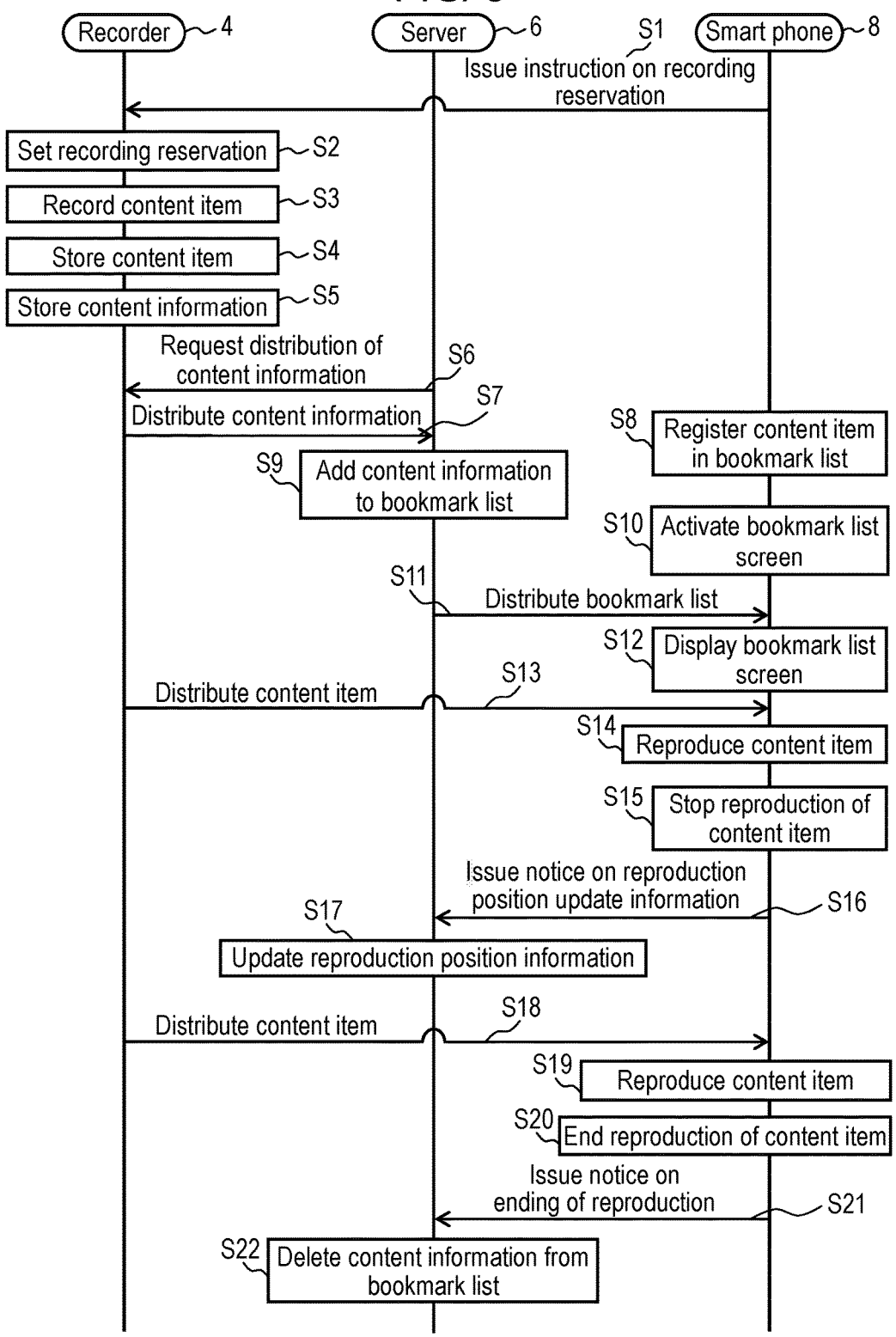
FIG. 8 is a sequence chart showing an example of a flow of operations of the content reproduction system in the first exemplary embodiment.

FIG. 8 is a sequence chart showing an example of a flow of operations of content reproduction system 2 in the first exemplary embodiment.

It is assumed that the user has performed a user's operation of selecting a desired content from an electronic program table (not shown) displayed on display 13 of smart phone 8. When the user's operation is accepted by acceptor 36 of smart phone 8, an instruction that is based on the user's operation is sent from acceptor 36 to acquisition unit 38 of smart phone 8, and an instruction for instructing a recording reservation of the content item concerned is transmitted from smart phone 8 to recorder 4 (Step S1). In record reserving controller 18 of recorder 4, an EPG recording reservation is set based on the instruction (Step S2).

Recorder 16 of recorder 4 records the content item based on the EPG recording reservation set in record reserving controller 18 of recorder 4 (Step S3).

The content to be recorded is stored in content storage 20 (Step S4).

Content information regarding the content item stored in content storage 20 is stored in content information storage 22 (Step S5).

Managing controller 34 of server 6 transmits, to recorder 4, a request signal for requesting recorder 4 to distribute the content information regarding the recorded content item (Step S6). Hereinafter, the request signal is simply referred to as "request". This request from server 6 to recorder 4 may be performed periodically.

In recorder 4 that has received this request, content information distributor 28 of recorder 4 reads the content information regarding the corresponding content item from content information storage 22, and distributes the read content information to server 6 (Step S7).

Note that the content item recorded in recorder 4 can be reproduced based on recording list screen 66 displayed on display 13 of smart phone 8.

Recording list screen 66 is a screen that shows a list of the content information regarding the recorded content items (refer to FIG. 9(a)). On recording list screen 66, the title, recording date and time, recording time and the like of each of the recorded content items, are displayed for each of the content items. It is assumed that the user has performed a user's operation of tapping finger 44 on display 68 of a content item of "Program B", for example, in order to reproduce the content item of "Program B" (refer to FIG. 9(a)). When the user's operation is accepted by acceptor 36 of smart phone 8, an instruction that is based on the user's operation is sent from acceptor 36 to reproduction controller 42 of smart phone 8. In this way, reproduction screen 52 is displayed on display 13 as shown in FIG. 7. It is assumed that, next, the user performs the user's operation of tapping reproduction button 62 by finger 44. When the user's operation is accepted by acceptor 36 of smart phone 8, the instruction that is based on the user's operation is sent from acceptor 36 to reproduction controller 42 of smart phone 8. In this way, the content item of "Program B" is reproduced on display area 60.

It is assumed that, next, the user has performed a user's operation of registering the desired content item in the bookmark list on smart phone 8. When the user's operation is accepted by acceptor 36 of smart phone 8, the instruction that is based on the user's operation is sent from acceptor 36 to acquisition unit 38 of smart phone 8. In this way, a request to register the content item in the bookmark list is transmitted from smart phone 8 to server 6 (Step S8).

In server 6 that has received this request, managing controller 34 of server 6 adds the content information of the content item, which is distributed from recorder 4, to the bookmark list (Step S9). Note that a procedure of registering the content item in the bookmark list will be described later.

It is assumed that, thereafter, the user has performed a user's operation of displaying bookmark list screen 46 (refer to FIG. 6) on smart phone 8 in order to view the content item registered in the bookmark list. When the user's operation is accepted by acceptor 36 of smart phone 8, an application (software) for displaying bookmark list screen 46 (refer to FIG. 6) is activated in smart phone 8. Moreover, an instruction that is based on the user's operation is sent from acceptor 36 to acquisition unit 38 of smart phone 8, and a distribution request for the bookmark list is transmitted from acquisition unit 38 to server 6 (Step S10).

Server 6 that has received this request distributes the bookmark list to smart phone 8 from list distributor 32 of server 6 (Step S11).

Acquisition unit 38 of smart phone 8 acquires this bookmark list, whereby display controller 40 of smart phone 8 allows display 13 to display bookmark list screen 46 based on the bookmark list (Step S12).

It is assumed that the user has performed a user's operation of tapping display 70 (refer to FIG. 6) of the content item of "Program B" by finger 44 on bookmark list screen 46, for example, in order to reproduce the content item of "Program B" registered in the bookmark list. When the user's operation is accepted by acceptor 36 of smart phone 8, an instruction that is based on the user's operation is sent from acceptor 36 to reproduction controller 42 of smart phone 8. In this way, reproduction screen 52 (refer to FIG. 7) is displayed on display 13. It is assumed that, next, the user has performed the user's operation of tapping reproduction button 62 by finger 44. When the user's operation is accepted by acceptor 36 of smart phone 8, an instruction that is based on the user's operation is sent from acceptor 36 to reproduction controller 42 of smart phone 8. In this way, a distribution request for the content item of "Program B" is transmitted from smart phone 8 to recorder 4. Recorder 4 that has received this request distributes the content item of "Program B" to smart phone 8 from content distributor 26 of recorder 4 (Step S13).

In this way, in smart phone 8, the reproduction (so-called streaming reproduction) of the content item of "Program B" is started while the content item of "Program B" is being received (Step S14).

It is assumed that the user has performed the user's operation of tapping stop button 64 by finger 44 before the terminal end of the content item. When the user's operation is accepted by acceptor 36 of smart phone 8, the instruction that is based on the user's operation is sent from acceptor 36 to reproduction controller 42 of smart phone 8, and the reproduction of the content item is stopped (Step S15).

At this time, smart phone 8 issues a notice on reproduction position update information from reproduction controller 42 to managing controller 34 of server 6 (Step S16).

This reproduction position update information is data indicating an updated reproduction position of the content item. For example, in a case where a reproduction position of the content item at a point of time when the reproduction is started is "0 hour 10 minutes 00 second", and a reproduction position of the content item at a point of time when the reproduction is stopped is "0 hour 20 minutes 00 second", then the updated reproduction position of the content item becomes "0 hour 20 minutes 00 second".

Upon receiving the notice on the reproduction position update information from smart phone 8, managing controller 34 of server 6 updates the reproduction position information, which is included in the bookmark list, based on the reproduction position update information (Step S17).

It is assumed that, thereafter, the user has performed the user's operation of tapping reproduction button 62 of reproduction screen 52 by finger 44 in a similar way to the above-mentioned case, for example, in order to reproduce the content item of "Program B", which is registered in the bookmark list, one more time. When the user's operation is accepted by acceptor 36 of smart phone 8, an instruction that is based on the user's operation is sent from acceptor 36 to reproduction controller 42 of smart phone 8. In this way, the distribution request for the content item of "Program B" is transmitted from smart phone 8 to recorder 4. Recorder 4 that has received this request refers to the reproduction position information of "Program B" registered in the bookmark list, and from the updated reproduction position, distributes the content item of "Program B" from content distributor 26 of recorder 4 to smart phone 8 (Step S18).

In this way, on smart phone 8, the content item of "Program B" is started from the updated reproduction position (for example, "0 hour 20 minutes 00 second") (Step S19). That is, the content item of "Program B" is corresponding to so-called resume reproduction.

When the content item of "Program B" is reproduced to the terminal end of the content item, the reproduction of the content item is finished (Step S20).

At this time, reproduction controller 42 of smart phone 8 notifies managing controller 34 of server 6 that the reproduction of the content item is finished (Step S21).

In this way, managing controller 34 of server 6 determines that the reproduction of the content item is finished, and deletes the content information regarding the content item of "Program B" from the bookmark list (Step S22).

At this time, display controller 40 of smart phone 8 deletes display 70 (refer to FIG. 6) of the content item of "Program B" from bookmark list screen 46.

Moreover, managing controller 34 of server 6 adds the content information regarding the content item of "Program B" to a display history list. At this time, display controller 40 of smart phone 8 adds the display of the content item of "Program B" to the reproduction history list screen (not shown).

Note that, in this exemplary embodiment, the description is made of the operation example where managing controller 34 of server 6 determines that the reproduction of the content item is finished in the case where the content item is reproduced to the terminal end of the content item; however, the present disclosure may not limited to this. Managing controller 34 of server 6 may determine that the reproduction of the content item is finished, for example, in a case where a residual reproduction time of the content item is a predetermined time (for example, 3 minutes) or less and a ratio of the residual reproduction time to the recording time (total reproduction time) of the content item is a predetermined value (for example, 10%) or less at a point of time when acceptor 36 of smart phone 8 accepts the user's operation of stopping the reproduction of the content item. Note that the above-described predetermined values may be varied in response to a type of a broadcasting station (for example, a state-run broadcasting station or a commercial broadcasting station) that has broadcast the content item.

[1-6. Registration Procedure of Bookmark]

Next, a procedure of registering the content item in the bookmark list will be described with reference to FIG. 7 and FIG. 9 to FIG. 11.

Figure 9:
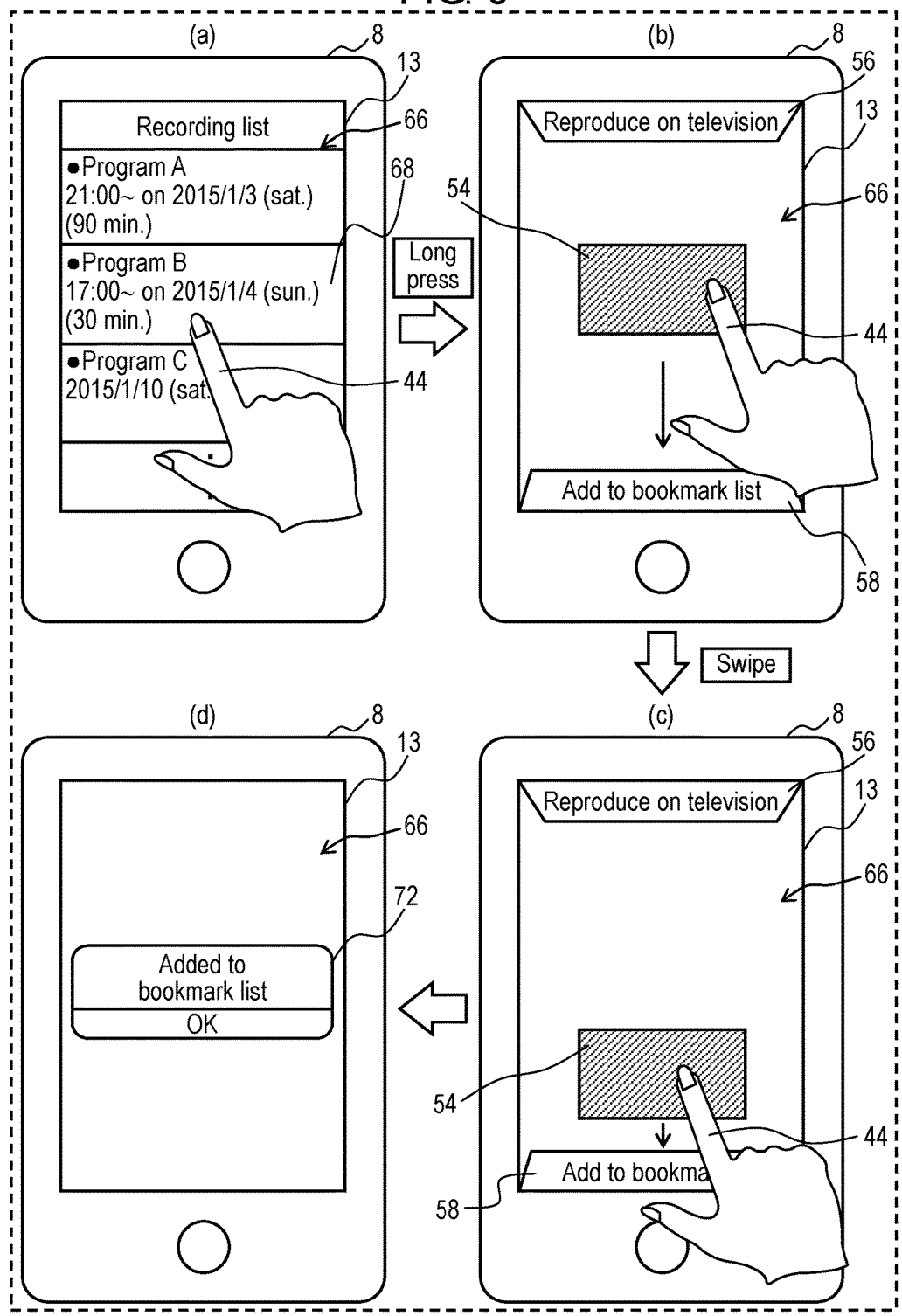
FIG. 9 is a diagram schematically showing an example of a procedure of registering a content item in the bookmark list in the first exemplary embodiment.
Figure 10:
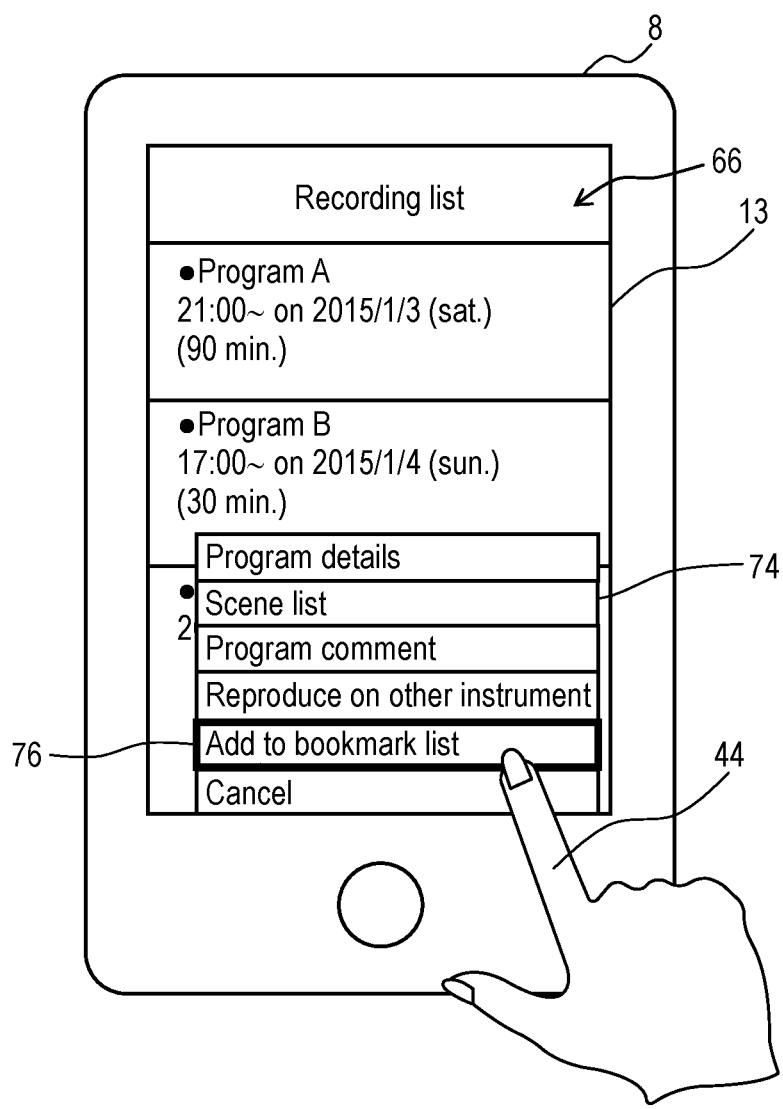
FIG. 10 is a diagram schematically showing an example of the procedure of registering the content item in the bookmark list in the first exemplary embodiment.
Figure 11:
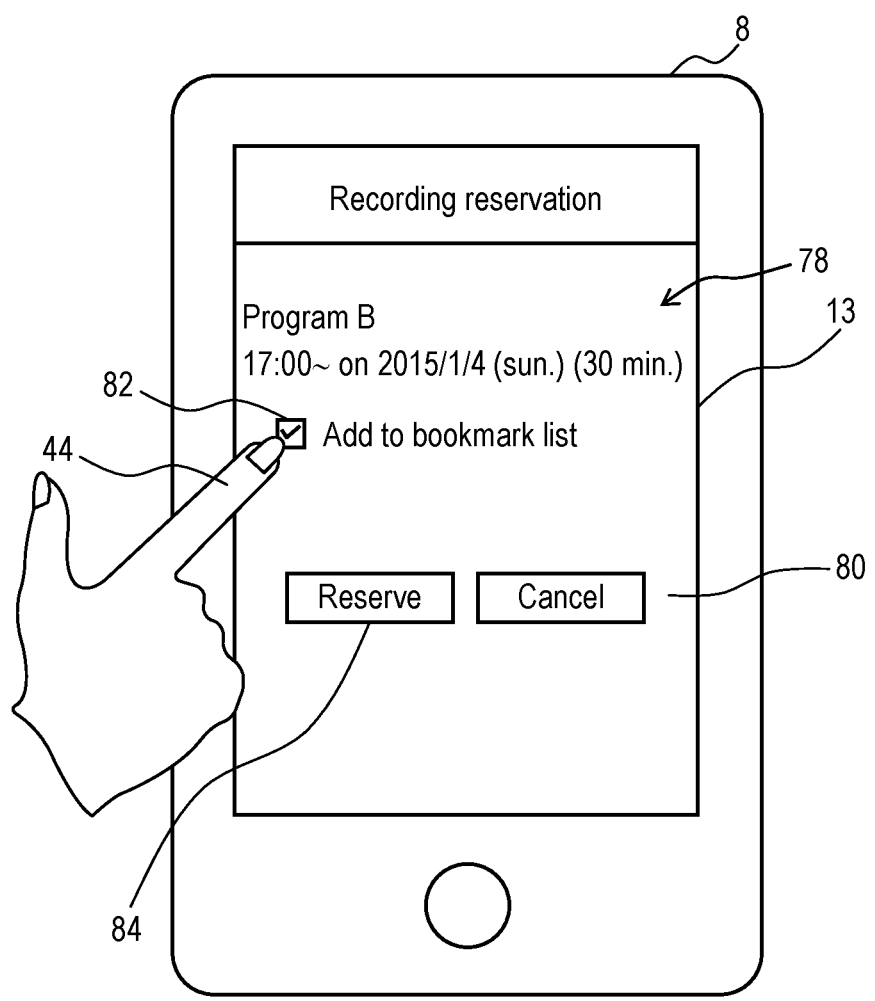
FIG. 11 is a diagram schematically showing an example of the procedure of registering the content item in the bookmark list in the first exemplary embodiment.

Each of FIG. 9 to FIG. 11 is a diagram schematically showing an example of the procedure of registering the content item in the bookmark list in the first exemplary embodiment.

[1-6-1. Case 1 of Registering Content Item from Recording List Screen to Bookmark List]

First, a description is made of a procedure (hereinafter, also referred to as "Procedure A") shown in FIG. 9. Hereinafter, a description is made of, as an example, a case where the user registers the content item of "Program B" in the bookmark list.

It is assumed that, as shown in FIG. 9(*a*), the user allows finger 44 to touch display 68 of the content item of "Program B" continuously for a predetermined time in a state where recording list screen 66 is displayed on display 13. When such a user's operation is accepted by acceptor 36, an instruction that is based on the user's operation is sent from acceptor 36 to display controller 40. In Procedure A, in this way, as shown in FIG. 9(*b*), icon 54 is superimposed and displayed on recording list screen 66, in addition, menu 56 is displayed on an upper end portion of recording list screen 66, and menu 58 is displayed on a lower end portion of recording list screen 66.

It is assumed that, thereafter, as shown in FIG. 9(*c*), the user has performed a user's operation of swiping finger 44 toward menu 58 ("Add to Bookmark List") on display 13. When the user's operation is accepted by acceptor 36, an instruction that is based on the user's operation is sent from acceptor 36 to display controller 40 and acquisition unit 38. In this way, on display 13, icon 54 moves in a direction directed toward menu 58. Moreover, a request to register the content item of "Program B" in the bookmark list is transmitted from smart phone 8 to server 6.

Acceptor 36 of smart phone 8 detects such touching operation (long-pressing operation) and swipe operation by finger 44 of the user, which are as mentioned above, and thereby accepts the user's operation of registering the content item of "Program B" in the bookmark list (that is, a user's operation of selecting the content item). In this way, Step S8 of FIG. 8, which is mentioned above, is executed.

Thereafter, as shown in FIG. 9(*d*), on a center portion of recording list screen 66, a dialog box 72 is displayed, which indicates that the content item of "Program B" is registered in the bookmark list. That is, this indicates that the content information regarding the content item of "Program B" is added to the bookmark list.

Note that, it is assumed that the user has performed a user's operation of swiping finger 44 toward menu 56 ("Reproduce on Television") on display 13 in a state shown in FIG. 9(*b*). When the user's operation is accepted by acceptor 36, an instruction that is based on the user's operation is sent from acceptor 36 to display controller 40 and reproduction controller 42. In that case, on display 13, icon 54 moves in a direction directed toward menu 56. Moreover, an instruction to reproduce the content item of "Program B" on television receiver 12 is transmitted from reproduction controller 42 to recorder 4. In this way, the content item of "Program B" is reproduced on television receiver 12. At this time, in a case where a power supply of television receiver 12 is in a standby state, the user performs a user's operation of swiping finger 44 toward menu 56 on display 13, whereby the power supply of television receiver 12 may be automatically turned on, and thereafter, the content item of "Program B" may be reproduced on television receiver 12.

Note that a sub-menu (not shown) including a button (not shown) for releasing the registration of the bookmark may be displayed on bookmark list screen 46. The user performs a user's operation of tapping this button by finger 44, whereby smart phone 8 may operate so that content information regarding an arbitrary content item can be deleted from the bookmark list.

[1-6-2. Case 2 of Registering Content Item from Recording List Screen to Bookmark List]

Next, a description is made of a procedure (hereinafter, also referred to as "Procedure B") shown in FIG. 10. Hereinafter, a description is made of, as an example, a case where the user registers the content item of "Program B" in the bookmark list.

It is assumed that, in a state where recording list screen 66 is displayed on display 13, the user has performed a user's operation of tapping an overflow button (not shown), which is displayed on recording list screen 66, by finger 44, for example, after the content item of "Program B" is selected. When the user's operation is accepted by acceptor 36, an instruction that is based on the user's operation is sent from acceptor 36 to display controller 40. In Procedure B, in this way, sub-menu 74 is superimposed and displayed on recording list screen 66 as shown in FIG. 10.

Sub-menu 74 includes button 76 for registering the content item in the bookmark list, and the like. When the user performs a user's operation of tapping this button 76 by finger 44, the user's operation is accepted by acceptor 36. In this way, acceptor 36 of smart phone 8 accepts the user's operation of registering the content item of "Program B" in the bookmark list. In this way, an instruction that is based on the user's operation is sent from acceptor 36 to acquisition unit 38, and Step S8 of FIG. 8, which is mentioned above, is executed.

[1-6-3. Case of Registering Content Item from Reproduction Screen to Bookmark List]

Next, a description is made of a procedure (hereinafter, also referred to as "Procedure C") shown in FIG. 7. Hereinafter, a description is made of, as an example, a case where the user registers the content item of "Program B" in the bookmark list.

It is assumed that the user has touched reproduction screen 52 by finger 44 continuously for a predetermined time, for example, in a state where the content item of "Program B" is reproduced on reproduction screen 52 transitioned from recording list screen 66. When such a user's operation is accepted by acceptor 36, an instruction that is based on the user's operation is sent from acceptor 36 to display controller 40. In Procedure C, in this way, as shown in FIG. 7, in a similar way to Procedure A mentioned above, icon 54 is superimposed and displayed on reproduction screen 52, in addition, menu 56 is displayed on the upper end portion of reproduction screen 52, and menu 58 is displayed on the lower end portion of reproduction screen 52.

It is assumed that, thereafter, in a similar way to Procedure A mentioned above, the user has performed the user's operation of swiping finger 44 toward menu 58 (Add to Bookmark List) on display 13. When the user's operation is accepted by acceptor 36, an instruction that is based on the user's operation is sent from acceptor 36 to display controller 40 and acquisition unit 38. In this way, on display 13, icon 54 moves in a direction directed toward menu 58. Moreover, a request to register the content item of "Program B" in the bookmark list is transmitted from smart phone 8 to server 6.

In Procedure C, in this way, acceptor 36 of smart phone 8 accepts the user's operation of registering the content item of "Program B" in the bookmark list, and Step S8 of FIG. 8, which is mentioned above, is executed. Thereafter, on the center portion of reproduction screen 52, a dialog box (not shown) is displayed, which indicates that the content item of "Program B" is registered in the bookmark list.

In Procedure C, a reproduction position at a point of time when the content item of "Program B" is registered in the bookmark list is stored as the reproduction position information in the bookmark list. Note that, in place of this configuration, a reproduction position at a point of time when the reproduction of the content item of "Program B" is stopped after being registered in the bookmark list may be stored as the reproduction position information in the bookmark list.

[1-6-4. Case of Registering Content Item from Recording Reservation Screen to Bookmark List]

Next, a description is made of a procedure (hereinafter, also referred to as "Procedure D") shown in FIG. 11. Hereinafter, a description is made of, as an example, the case where the user registers the content item of "Program B" in the bookmark list.

It is assumed that the user has performed the user's operation of selecting the content item of "Program B" from the electronic program table (not shown) in a state where recording reservation screen 78 for performing the recording reservation of the content item is displayed on display 13 of smart phone 8. When such a user's operation is accepted by acceptor 36, an instruction that is based on the user's operation is sent from acceptor 36 to display controller 40. In Procedure D, in this way, as shown in FIG. 11, display 80 of the content item of "Program B" is displayed on recording reservation screen 78.

Thereafter, when a user's operation of tapping check box 82 by finger 44 on recording reservation screen 78 is performed by the user, and the user's operation is accepted by acceptor 36, then an instruction that is based on the user's operation is sent from acceptor 36 to display controller 40. In this way, check box 82 is set to be checked on recording reservation screen 78. Thereafter, when the user performs a user's operation of tapping reservation button 84 on recording reservation screen 78 by finger 44, and the user's operation is accepted by acceptor 36, then an instruction that is based on the user's operation is sent from acceptor 36 to acquisition unit 38. In this way, an instruction to reserve the recording of the content item of "Program B" is transmitted from smart phone 8 to recorder 4.

In procedure D, in this way, acceptor 36 of smart phone 8 accepts the user's operation for registering the content item of "Program B" in the bookmark list.

Thereafter, when the recording of the content item of "Program B" is completed in recorder 4, a signal indicating that the recording of the content item of "Program B" is completed is transmitted from recorder 4 to server 6. In this way, managing controller 34 of server 6 adds the content information regarding the content item of "Program B" to the bookmark list. In this way, Step S8 of FIG. 8, which is mentioned above, is executed.

[1-7. Management Method of Bookmark List]

Next, a management method of the bookmark list by managing controller 34 will be described with reference to FIG. 12.

FIG. 12 is a diagram schematically showing an example of the management method of the bookmark list by managing controller 34 in the first exemplary embodiment.

As shown in FIG. 12(*a*), in a state where the user does not register the content item in the bookmark list, the content information is not registered in the bookmark list.

It is assumed that, thereafter, as shown in FIG. 12(*b*), for example, the user has performed a user's operation of registering the content item of "Program A" in the bookmark list from recording list screen 66 by smart phone 8 according to Procedure A or Procedure B, which is mentioned above. In this way, the content information regarding the content item of "Program A" is added to the bookmark list. Note that this content item of "Program A" is assumed not to be reproduced until being registered in the bookmark list. In that case, a reproduction position of the content item of "Program A" is "0:00:00 (0 hour 00 minute 00 second)".

It is assumed that, thereafter, as shown in FIG. 12(*c*), for example, the user has performed a user's operation of registering the content item of "Program B" in the bookmark list from reproduction screen 52 by smart phone 8 according to Procedure C mentioned above. In this way, the content information regarding the content item of "Program B" is added to the bookmark list. Note that this content item of "Program B" is assumed to be registered in the bookmark list, for example, at a point of time when 12 minutes have elapsed since the start of the reproduction. In that case, a reproduction position of the content item of "Program B" is "0:12:00 (0 hour 12 minutes 00 second)".

It is assumed that, thereafter, as shown in FIG. 12(*d*), for example, the user has performed a user's operation of registering a content item of "Program C" in the bookmark list from recording reservation screen 78 by smart phone 8 according to Procedure D mentioned above. In this way, the content information regarding the content item of "Program C" is added to the bookmark list. Note that this content item of "Program C" is assumed not to be reproduced until being registered in the bookmark list. In that case, a reproduction position of the content item of "Program C" is "0:00:00 (0 hour 00 minute 00 second)".

It is assumed that, thereafter, as shown in FIG. 12(*e*), for example, the user has performed a user's operation of reproducing the content item of "Program A" by smart phone 8. In that case, the reproduction of the content item of "Program A" is started from a head (0 hour 00 minute 00 second) of the content item. It is assumed that, thereafter, the user has performed a user's operation of stopping the reproduction of the content item by smart phone 8, for example, at a point of time when 10 minutes have elapsed since the start of the reproduction of the content item. In that case, the reproduction position of the content item of "Program A" is updated to "0:10:00 (0 hour 10 minutes 00 second)".

It is assumed that, thereafter, as shown in FIG. 12(f), the user has performed a user's operation of reproducing the content item of "Program B" by smart phone 8. In that case, the reproduction of the content item of "Program B" is started from "0:12:00 (0 hour 12 minutes 00 second)" as the reproduction position of the content item. It is assumed that, thereafter, the content item has been reproduced to a terminal end (0 hour 30 minutes 00 second). In that case, the content information regarding the content item of "Program B" is deleted from the bookmark list.

[1-8. Effects and the Like]

As mentioned above, in this exemplary embodiment, the content reproduction system includes: a server; and a terminal apparatus for reproducing a content item. The server includes: a list storage; and a managing controller. The list storage stores a bookmark list. The bookmark list includes content information including reproduction position information indicating a reproduction position of the content item. The managing controller manages the bookmark list. The terminal apparatus includes: a display; an acceptor that accepts an operation of a user; an acquisition unit that acquires the bookmark list from the server; a display controller; and a reproduction controller. The display controller allows the display to display a bookmark list screen indicating a list of the content information included in the bookmark list. In a case where the acceptor has accepted a user's operation of reproducing the content item, the reproduction controller starts reproduction of the content item from the reproduction position indicated by the reproduction position information. Moreover, in a case where the acceptor has accepted a user's operation of stopping the reproduction of the content item, the reproduction controller stops the reproduction of the content item, and notifies the managing controller of reproduction position update information indicating the updated reproduction position of the content item. Then, in a case of having been notified of the reproduction position update information from the reproduction controller of the terminal apparatus, the managing controller of the server updates the reproduction position information, which is included in the bookmark list, based on the reproduction position update information.

Note that content reproduction system 2 is an example of the content reproduction system. Server 6 is an example of the server. Smart phone 8 is an example of the terminal apparatus. List storage 30 is an example of the list storage. Managing controller 34 is an example of the managing controller. Display 13 is an example of the display. Acceptor 36 is an example of the acceptor. Acquisition unit 38 is an example of the acquisition unit. Display controller 40 is an example of the display controller. Reproduction controller 42 is an example of the reproduction controller. Bookmark list screen 46 is an example of the bookmark list screen.

For example, in a configuration example of content reproduction system 2 shown in the first exemplary embodiment, content reproduction system 2 includes: server 6; and smart phone 8 for reproducing the content item. Server 6 includes: list storage 30; and managing controller 34. List storage 30 stores the bookmark list having content information including reproduction position information indicating a reproduction position of a content item. Managing controller 34 manages the bookmark list. Smart phone 8 includes: display 13; acceptor 36 that accepts an operation of a user; acquisition unit 38 that acquires the bookmark list from server 6; display controller 40; and reproduction controller 42. Display controller 40 allows display 13 to display bookmark list screen 46 indicating a list of the content information included in the bookmark list. In a case where acceptor 36 has accepted a user's operation of reproducing the content item, reproduction controller 42 starts reproduction of the content item from the reproduction position indicated by the reproduction position information. Moreover, in a case where acceptor 36 has accepted a user's operation of stopping the reproduction of the content item, reproduction controller 42 stops the reproduction of the content item, and notifies managing controller 34 of reproduction position update information indicating the updated reproduction position of the content item. In a case of having been notified of the reproduction position update information from reproduction controller 42 of smart phone 8, managing controller 34 of server 6 updates the reproduction position information, which is included in the bookmark list, based on the reproduction position update information.

Moreover, in the content reproduction system, in a case of having determined that the reproduction of the content item is finished, the managing controller of the server may delete content information regarding the content item from the bookmark list.

For example, in the configuration example of content reproduction system 2 shown in the first exemplary embodiment, in a case of having determined that the reproduction of the content item is finished, managing controller 34 of server 6 deletes content information regarding the content item from the bookmark list.

Moreover, in this exemplary embodiment, a content reproduction method is a content reproduction method in a content reproduction system including: a server; and a terminal apparatus for reproducing a content item. This content reproduction method includes: storing a bookmark list, which has content information including reproduction position information indicating a reproduction position of a content item, in a list storage of a server; distributing the bookmark list from the server to the terminal apparatus; displaying a bookmark list screen, which indicates a list of content information included in the bookmark list, on a display of the terminal apparatus; starting reproduction of the content item from a reproduction position, which is indicated by reproduction position information, in a case where an acceptor of the terminal apparatus has accepted a user's operation of reproducing the content item; in a case where the acceptor has accepted a user's operation of stopping the reproduction of the content item, stopping the reproduction of the content item, and of issuing a notice on reproduction position update information, which indicates the updated reproduction position of the content item, from the terminal apparatus to the server; updating the reproduction position information, which is included in the bookmark list, based on the reproduction position update information, in a case where the notice on the reproduction position update information is issued from the terminal apparatus to the server; and deleting the content information regarding the content item from the bookmark list in a case where it is determined that the reproduction of the content item is finished.

For example, the content reproduction method illustrated in the first exemplary embodiment is a content reproduction method in content reproduction system 2 including server 6 and smart phone 8 for reproducing a content item. The content reproduction method includes: storing a bookmark list, which has content information including reproduction position information indicating a reproduction position of a content item, in list storage 30 of server 6; distributing the bookmark list from server 6 to smart phone 8; displaying bookmark list screen 46, which indicates a list of content information included in the bookmark list, on display 13 of smart phone 8; starting reproduction of the content item from a reproduction position, which is indicated by reproduction position information, in a case where acceptor 36 of smart phone 8 has accepted a user's operation of reproducing the content item; in a case where acceptor 36 has accepted a user's operation of stopping the reproduction of the content item, stopping the reproduction of the content item, and of issuing a notice on reproduction position update information, which indicates the updated reproduction position of the content item, from smart phone 8 to server 6; updating the reproduction position information, which is included in the bookmark list, based on the reproduction position update information, in a case where the notice on the reproduction position update information is issued from smart phone 8 to server 6; and deleting the content information regarding the content item from the bookmark list in a case where it is determined that the reproduction of the content item is finished.

In this way, managing controller 34 can update the reproduction position information, which is included in the bookmark list, in a case where the reproduction of the content item is stopped. Hence, the user can view the content item from a reproduction position where the reproduction was stopped at previous viewing. Moreover, in a case of having determined that the reproduction of the content item is finished, managing controller 34 can delete content information regarding the content item from the bookmark list. Hence, the user can easily find a content item, of which reproduction is not still ended, from bookmark list screen 46. Hence, convenience for the user in a case where the user reproduces the content item in smart phone 8 can be enhanced.

The content reproduction system may further include a video recording apparatus for recording the content item. The video recording apparatus may include: a recorder that records the content item in a content storage; the content storage that stores the content item in accordance with an instruction of the recorder; a content information storage that stores content information regarding the recorded content item; a content distributor; and a content information distributor. In a case where the acceptor of the terminal apparatus has accepted the user's operation of reproducing the content item, the content distributor may distribute the content item, which is stored in the content storage, to the terminal apparatus. The content information distributor may distribute the content information, which is stored in the content information storage, to the server.

Note that recorder 4 is an example of the video recording apparatus. Recorder 16 is an example of the recorder. Content storage 20 is an example of the content storage. Content information storage 22 is an example of the content information storage. Content distributor 26 is an example of the content distributor. Content information distributor 28 is an example of the content information distributor.

For example, in the configuration example of content reproduction system 2 shown in the first exemplary embodiment, content reproduction system 2 further includes: recorder 4 for recording the content item. Recorder 4 includes: recorder 16 that records the content item in content storage 20; content storage 20 that stores the content item in accordance with an instruction of recorder 16; content information storage 22 that stores content information regarding the recorded content item; content distributor 26; and content information distributor 28. In a case where acceptor 36 of smart phone 8 has accepted the user's operation of reproducing the content item, content distributor 26 distributes the content item, which is stored in content storage 20, to smart phone 8. Content information distributor 28 distributes the content information, which is stored in content information storage 22, to server 6.

In this way, in content reproduction system 2, the content item recorded in recorder 4 can be distributed from recorder 4 to smart phone 8.

In the content reproduction system, the managing controller of the server may determine that the reproduction of the content item is finished in a case where the content item is reproduced to the terminal end of the content item.

For example, in the configuration example of content reproduction system 2 shown in the first exemplary embodiment, managing controller 34 of server 6 determines that the reproduction of the content item is finished in the case where the content item is reproduced to the terminal end of the content item.

In this way, managing controller 34 of server 6 can determine that the reproduction of the content item is finished in a case where the user has viewed the content item to the terminal end of the content item.

In the content reproduction system, the managing controller of the server may determine that the reproduction of the content item is finished in a case where the residual reproduction time of the content item is the predetermined time or less and the ratio of the residual reproduction time to the total reproduction time of the content item is the predetermined value or less at the point of time when the acceptor of the terminal apparatus accepts the user's operation of stopping the reproduction of the content item. For example, in the configuration example of content reproduction system 2 shown in the first exemplary embodiment, managing controller 34 of server 6 determines that the reproduction of the content item is finished in the case where the residual reproduction time of the content item is the predetermined time or less and the ratio of the residual reproduction time to the total reproduction time of the content item is the predetermined value or less at the point of time when acceptor 36 of smart phone 8 accepts the user's operation of stopping the reproduction of the content item.

In this way, managing controller 34 of server 6 can determine that the reproduction of the content item is finished in a case where the user has viewed the content item to a vicinity of the terminal end of the content item.

In the content reproduction system, the list storage of the server may further store the reproduction history list including the content information regarding the content items of which reproduction is finished. In the case of having determined that the reproduction of the content item is finished, the managing controller of the server may delete content information regarding the content item from the bookmark list, and in addition, may add the content information to the reproduction history list.

For example, in the configuration example of content reproduction system 2 shown in the first exemplary embodiment, list storage 30 of server 6 further stores the reproduction history list including the content information regarding the content items of which reproduction is finished. In the case of having determined that the reproduction of the content item is finished, managing controller 34 of server 6 deletes the content information regarding the content item from the bookmark list, and in addition, adds the content information to the reproduction history list.

In this way, even in a case where the content information is deleted from the bookmark list, the user can reproduce the content item corresponding to the content information from the reproduction history list screen.

In the content reproduction system, the managing controller of the server may add the content information regarding the content item to the bookmark list in response to that the acceptor of the terminal apparatus accepts the user's operation of selecting the content item.

For example, in the configuration example of content reproduction system 2 shown in the first exemplary embodiment, managing controller 34 of server 6 adds the content information regarding the content item to the bookmark list in response to that acceptor 36 of smart phone 8 accepts the user's operation of selecting the content item.

In this way, the user can register the content item in the bookmark list by using smart phone 8.

In the content reproduction system, the managing controller of the server may add the content information regarding the content item to the bookmark list in response to that the acceptor of the terminal apparatus accepts the user's operation of selecting the content item in a state where the content item is reproduced.

For example, in the configuration example of content reproduction system 2 shown in the first exemplary embodiment, managing controller 34 of server 6 adds the content information regarding the content item to the bookmark list in response to that acceptor 36 of smart phone 8 accepts the user's operation of selecting the content item in the state where the content item is reproduced.

In this way, the user can register the content item in the bookmark list by using smart phone 8 even if the content is under reproduction.

In the terminal apparatus of the content reproduction system, the display may include a touch panel. The acceptor may accept the user's operation of selecting the content item in a case of having detected that the finger is swiped in a predetermined direction on the display from a state where the display is touched by the finger continuously for a predetermined time. The display controller may allow the display to display an icon in a case where the display is touched by the finger continuously for a predetermined time. Moreover, the display controller may move the icon in a predetermined direction in a case where the finger is swiped on the display in the predetermined direction in a state where the icon is displayed on the display.

Note that icon 54 is an example of the icon.

For example, in the configuration example of content reproduction system 2 shown in the first exemplary embodiment, display 13 has a touch panel in smart phone 8. Acceptor 36 accepts the user's operation of selecting the content item in a case of having detected that finger 44 is swiped in the predetermined direction on display 13 from the state where display 13 is touched by finger 44 continuously for the predetermined time. Display controller 40 allows display 13 to display icon 54 in a case where display 13 is touched by finger 44 continuously for the predetermined time. Moreover, display controller 40 moves icon 54 in a predetermined direction in a case where finger 44 is swiped on display 13 in the predetermined direction in a state where icon 54 is displayed on display 13.

In this way, the user can register the content item in the bookmark list by a relatively simple operation.

In the content reproduction system, the acceptor of the terminal apparatus may be capable of accepting the user's operation of selecting the content item in a state where the recording reservation screen for reserving the recording of the content item is displayed on the display. The managing controller of the server may add the content information regarding the content item in the bookmark list in a case where the recording of the content item is completed.

Note that recording reservation screen 78 is an example of the recording reservation screen.

For example, in the configuration example of content reproduction system 2 shown in the first exemplary embodiment, acceptor 36 of smart phone 8 is capable of accepting the user's operation of selecting the content item in a state where recording reservation screen 78 for reserving the recording of the content item is displayed on display 13. Managing controller 34 of server 6 adds the content information regarding the content item to the bookmark list in the case where the recording of the content item is completed. In this way, in a case of performing the recording reservation for the content item, the user can perform an operation for registering the content item in the bookmark list.

Second Exemplary Embodiment

[2-1. Overall Configuration of Content Reproduction System]

Figure 13:
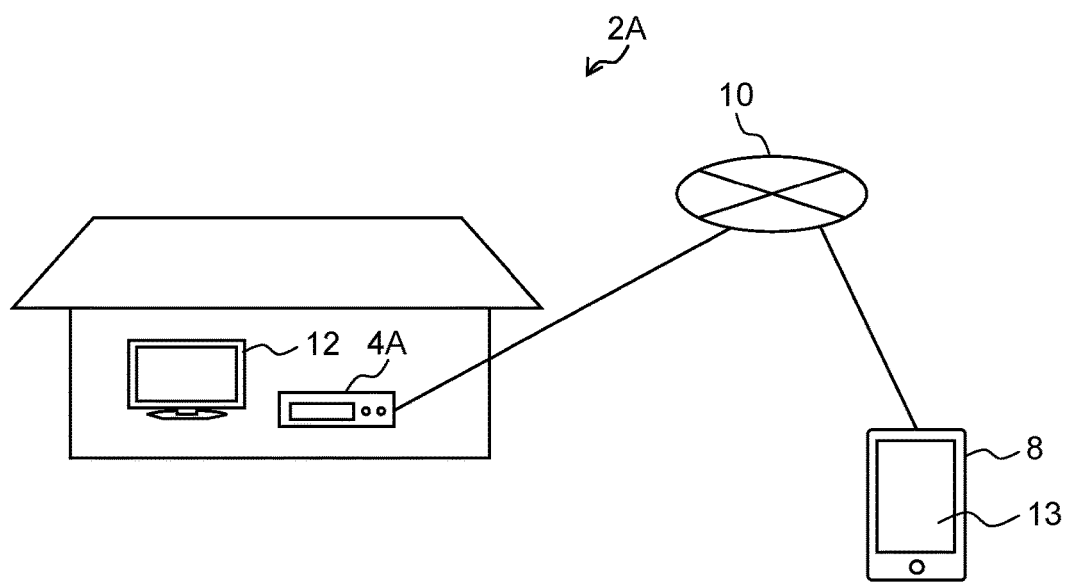
FIG. 13 is a diagram schematically showing a configuration example of a content reproduction system in a second exemplary embodiment.

Next, a description is made of an overall configuration of content reproduction system 2A in a second exemplary embodiment with reference to FIG. 13.

FIG. 13 is a diagram schematically showing a configuration example of content reproduction system 2A in the second exemplary embodiment.

As shown in FIG. 13, content reproduction system 2A of this exemplary embodiment includes: recorder 4A; and smart phone 8. Content reproduction system 2A does not include server 6 in comparison with content reproduction system 2 described in the first exemplary embodiment. In content reproduction system 2A, recorder 4A has a function of server 6 mentioned above.

Note that smart phone 8 shown in the second exemplary embodiment has substantially the same configuration as smart phone 8 shown in the first exemplary embodiment, and accordingly, a description of smart phone 8 shown in the second exemplary embodiment is omitted.

[2-2. Functional Configuration of Recorder]

Figure 14:
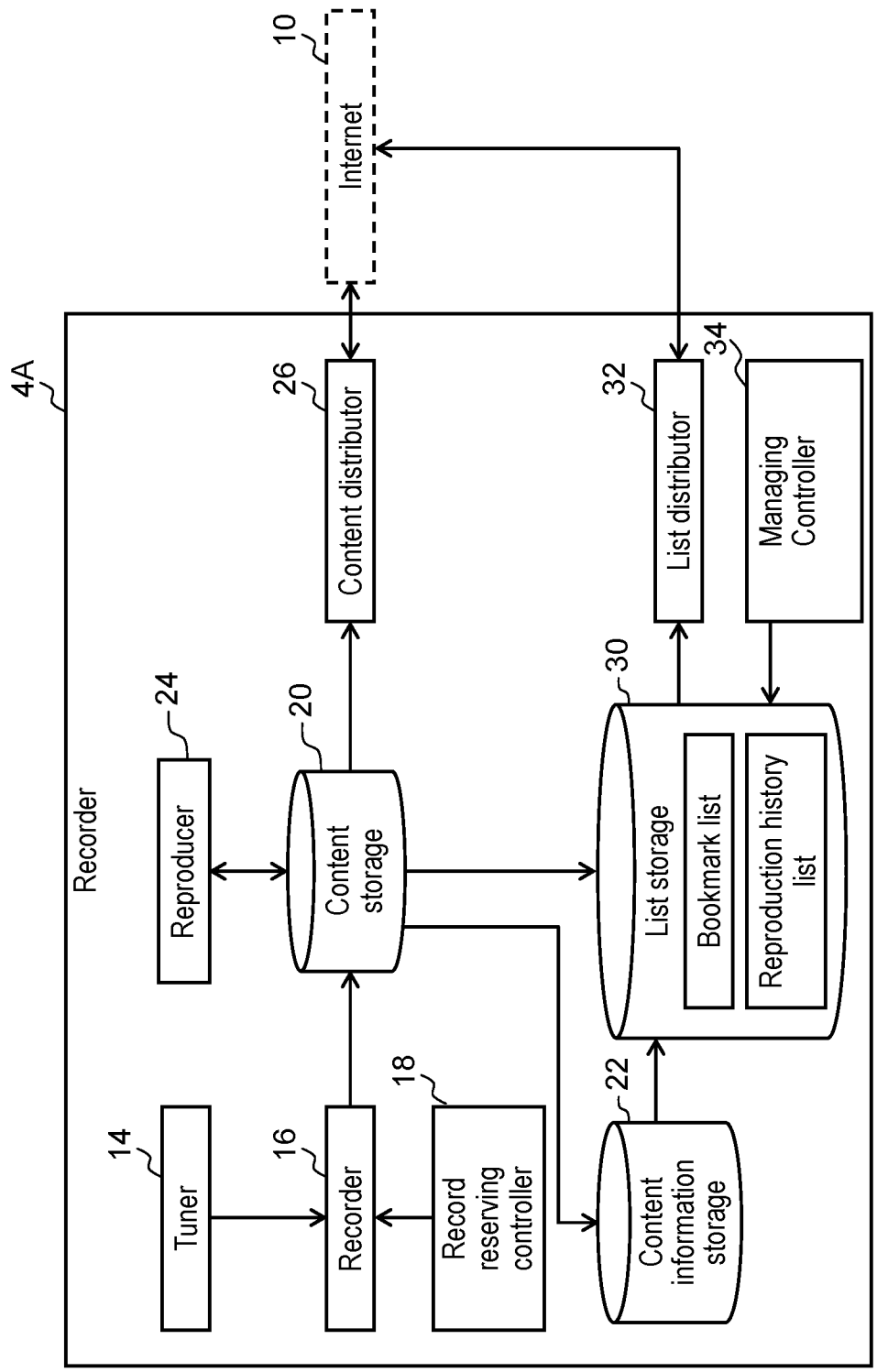
FIG. 14 is a block diagram schematically showing an example of a functional configuration of a recorder in the second exemplary embodiment.

Next, a description is made of a functional configuration of recorder 4A with reference to FIG. 14.

FIG. 14 is a block diagram schematically showing an example of the functional configuration of recorder 4A in the second exemplary embodiment.

As shown in FIG. 14, recorder 4A further includes: list storage 30; list distributor 32; and managing controller 34 in addition to the constituent elements provided in recorder 4 described in the first exemplary embodiment.

Note that recorder 4A does not include content information distributor 28 provided in recorder 4 described in the first exemplary embodiment. This is because recorder 4A has the functions of server 6 mentioned above.

List storage 30, list distributor 32 and managing controller 34, which are provided in recorder 4A, have substantially the same functions as list storage 30, list distributor 32 and managing controller 34, which are provided in server 6 described in the first exemplary embodiment. Therefore, in this exemplary embodiment, a description of list storage 30, list distributor 32 and managing controller 34, which are provided in recorder 4A, is omitted.

[2-3. Operations of Content Reproduction System]

Next, operations of content reproduction system 2A will be described with reference to FIG. 15.

Figure 15:
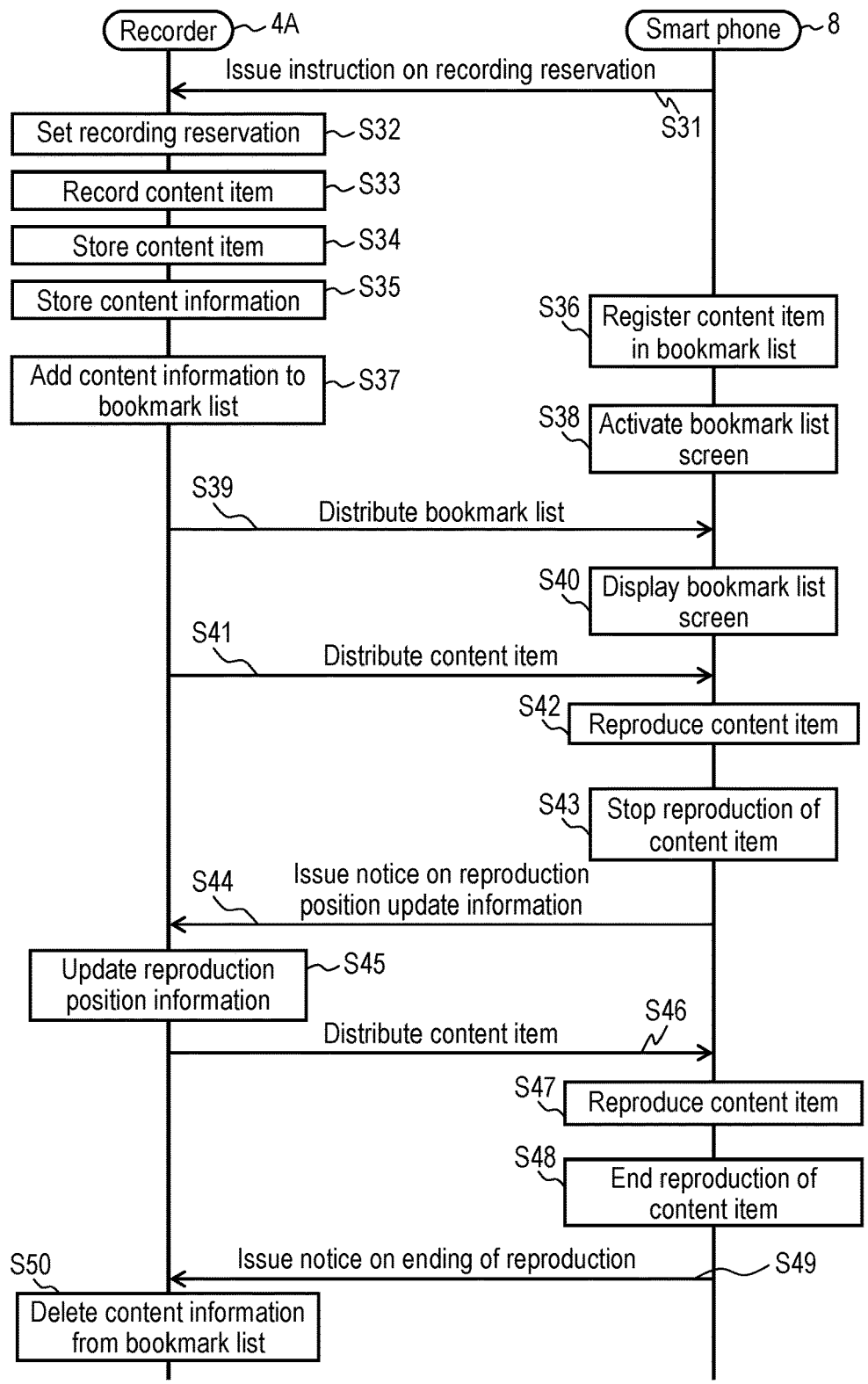
FIG. 15 is a sequence chart showing an example of a flow of operations of the content reproduction system in the second exemplary embodiment.

FIG. 15 is a sequence chart showing an example of a flow of operations of content reproduction system 2A in the second exemplary embodiment.

As shown in FIG. 15, first, Steps S31 to S35 are executed. Note that the respective steps which are Steps S31 to S35 perform substantially the same processing as the respective steps which are Steps S1 to S5 described with reference to FIG. 8 in the first exemplary embodiment, and accordingly, a description of Steps S31 to S35 is omitted.

It is assumed that, next, the user has performed a user's operation of registering a desired content item in the bookmark list on smart phone 8. When the user's operation is accepted by acceptor 36 of smart phone 8, an instruction that is based on the user's operation is sent from acceptor 36 to acquisition unit 38 of smart phone 8. In this way, a request to register the content item in the bookmark list is transmitted from smart phone 8 to recorder 4A (Step S36).

Note that the user's operation of registering the desired content item in the bookmark list is substantially the same as the operation described in the first exemplary embodiment, and accordingly, a description of the user's operation is omitted.

In recorder 4A that has received this request, managing controller 34 of recorder 4A adds the content information of the content item to the bookmark list (Step S37).

It is assumed that, thereafter, the user has performed a user's operation of displaying bookmark list screen 46 (refer to FIG. 6) on smart phone 8 in order to view the content item registered in the bookmark list. When the user's operation is accepted by acceptor 36 of smart phone 8, an application (software) for displaying bookmark list screen 46 (refer to FIG. 6) is activated in smart phone 8. Moreover, an instruction that is based on the user's operation is sent from acceptor 36 to acquisition unit 38 of smart phone 8, and a distribution request for the bookmark list is transmitted from acquisition unit 38 to recorder 4A (Step S38).

Recorder 4A that has received this request distributes the bookmark list to smart phone 8 from list distributor 32 of recorder 4A (Step S39).

Acquisition unit 38 of smart phone 8 acquires this bookmark list, whereby display controller 40 of smart phone 8 allows display 13 to display bookmark list screen 46 based on the bookmark list (Step S40).

It is assumed that, for example, the user has performed a user's operation for reproducing the content item of "Program B", which is registered in the bookmark list, by smart phone 8. Note that this user's operation is substantially the same as the user's operation of Step S13, which is described in the first exemplary embodiment, and accordingly, a description of this user's operation is omitted. Then, it is assumed that the user has performed a user's operation of tapping reproduction button 62 by finger 44 on reproduction screen 52 (refer to FIG. 7) transitioned from bookmark list screen 46. When the user's operation is accepted by acceptor 36 of smart phone 8, an instruction that is based on the user's operation is sent from acceptor 36 to reproduction controller 42 of smart phone 8. In this way, a distribution request for the content item of "Program B" is transmitted from smart phone 8 to recorder 4A. Recorder 4A that has received this request distributes the content item of "Program B" to smart phone 8 from content distributor 26 of recorder 4A (Step S41).

In this way, in smart phone 8, the reproduction (streaming reproduction) of the content item of "Program B" is started (Step S42).

It is assumed that the user has performed the user's operation of tapping stop button 64 by finger 44 before the terminal end of the content item. When the user's operation is accepted by acceptor 36 of smart phone 8, the instruction that is based on the user's operation is sent from acceptor 36 to reproduction controller 42 of smart phone 8, and the reproduction of the content item is stopped (Step S43).

At this time, smart phone 8 issues a notice on reproduction position update information from reproduction controller 42 to managing controller 34 of recorder 4A (Step S44).

Upon receiving the notice on the reproduction position update information from smart phone 8, managing controller 34 of recorder 4A updates the reproduction position information, which is included in the bookmark list, based on the reproduction position update information (Step S45).

It is assumed that, thereafter, the user has performed the user's operation of tapping reproduction button 62 of reproduction screen 52 by finger 44 in a similar way to the above-mentioned case, for example, in order to reproduce the content item of "Program B", which is registered in the bookmark list, one more time. When the user's operation is accepted by acceptor 36 of smart phone 8, an instruction that is based on the user's operation is sent from acceptor 36 to reproduction controller 42 of smart phone 8. In this way, a distribution request for the content item of "Program B" is transmitted from smart phone 8 to recorder 4A. Recorder 4A that has received this request refers to the reproduction position information of "Program B" registered in the bookmark list, and from the updated reproduction position, distributes the content item of "Program B" from content distributor 26 of recorder 4A to smart phone 8 (Step S46).

In this way, on smart phone 8, the reproduction of the content item of "Program B" is started from the updated reproduction position (Step S47).

When the content item of "Program B" is reproduced to the terminal end of the content item, the reproduction of the content item is finished (Step S48).

At this time, reproduction controller 42 of smart phone 8 notifies managing controller 34 of recorder 4A that the reproduction of the content item is finished (Step S49).

In this way, managing controller 34 of recorder 4A determines that the reproduction of the content item is finished, and deletes the content information regarding the content item of "Program B" from the bookmark list (Step S50).

Moreover, managing controller 34 of recorder 4A adds the content information regarding the content item of "Program B" to a display history list.

[2-4. Effects and the Like]

As mentioned above, in this exemplary embodiment, the video recording apparatus is a video recording apparatus for recording a content item, the video recording apparatus being communicable with a terminal apparatus for reproducing the content item. This video recording apparatus includes: a recorder; a content storage; a content information storage; a content distributor; a list storage; and a managing controller. The recorder records the content item in the content storage. The content storage stores the content item in accordance with an instruction from the recorder. The content information storage stores content information regarding the recorded content item. The content distributor distributes the content item, which is stored in the content storage, to the terminal apparatus. The list storage stores a bookmark list having content information including reproduction position information indicating a reproduction position of the content item. The managing controller manages the bookmark list. Then, in a case where the terminal apparatus has accepted a user's operation of stopping the reproduction of the content item, the managing controller updates the reproduction position information, which is included in the bookmark list, based on reproduction position update information indicating the updated reproduction position of the content item. Moreover, in a case of having determined that the reproduction of the content item is finished on the terminal apparatus, managing controller deletes the content information regarding the content item from the bookmark list.

Note that content reproduction system 2A is an example of the content reproduction system. Smart phone 8 is an example of the terminal apparatus. Recorder 4A is an example of the video recording apparatus. Recorder 16 is an example of the recorder. Content storage 20 is an example of the content storage. Content information storage 22 is an example of the content information storage. Content distributor 26 is an example of the content distributor. List storage 30 is an example of the list storage. Managing controller 34 is an example of the managing controller.

For example, in the configuration example of recorder 4A shown in the second exemplary embodiment, recorder 4A is a video recording apparatus for recording the content item, the video recording apparatus being communicable with smart phone 8 for reproducing the content item. Recorder 4A includes: recorder 16; content storage 20; content information storage 22; content distributor 26; list storage 30; and managing controller 34. Recorder 16 records the content item in content storage 20. Content storage 20 stores the content item in accordance with an instruction from recorder 16. Content information storage 22 stores content information regarding the recorded content item. Content distributor 26 distributes the content item, which is stored in content storage 20, to smart phone 8. List storage 30 stores a bookmark list. The bookmark list includes content information including reproduction position information indicating a reproduction position of the content item. Managing controller 34 manages the bookmark list. Then, in a case where smart phone 8 has accepted a user's operation of stopping the reproduction of the content item, managing controller 34 updates the reproduction position information, which is included in the bookmark list, based on reproduction position update information indicating the updated reproduction position of the content item. Moreover, in a case of having determined that the reproduction of the content item is finished on smart phone 8, managing controller 34 deletes the content information regarding the content item from the bookmark list.

In this way, the functions of server 6, which are described in the first exemplary embodiment, can be imparted to recorder 4A.

Third Exemplary Embodiment

[3-1. Overall Configuration of Content Reproduction System]

Figure 16:
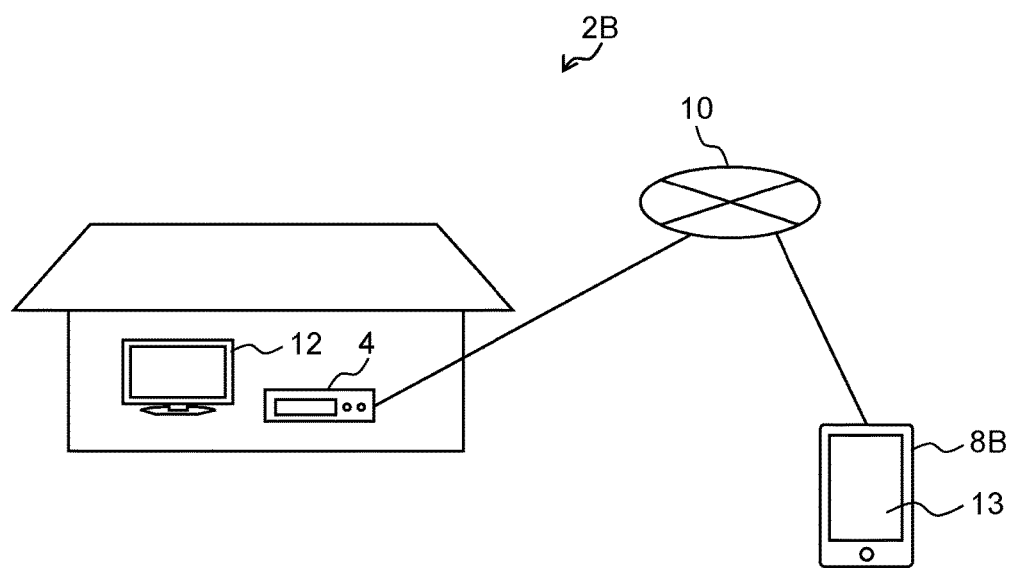
FIG. 16 is a diagram schematically showing a configuration example of a content reproduction system in a third exemplary embodiment.

Next, a description is made of an overall configuration of content reproduction system 2B in a third exemplary embodiment with reference to FIG. 16.

FIG. 16 is a diagram schematically showing a configuration example of content reproduction system 2B in the third exemplary embodiment.

As shown in FIG. 16, content reproduction system 2B of this exemplary embodiment includes: recorder 4; and smart phone 8B. Content reproduction system 2B does not include server 6 in comparison with content reproduction system 2 described in the first exemplary embodiment. In content reproduction system 2B, smart phone 8B has a function of server 6 mentioned above.

Note that recorder 4 shown in the third exemplary embodiment has substantially the same configuration as recorder 4 shown in the first exemplary embodiment, and accordingly, a description of recorder 4 shown in the third exemplary embodiment is omitted.

[3-2. Functional Configuration of Smart Phone]

Figure 17:
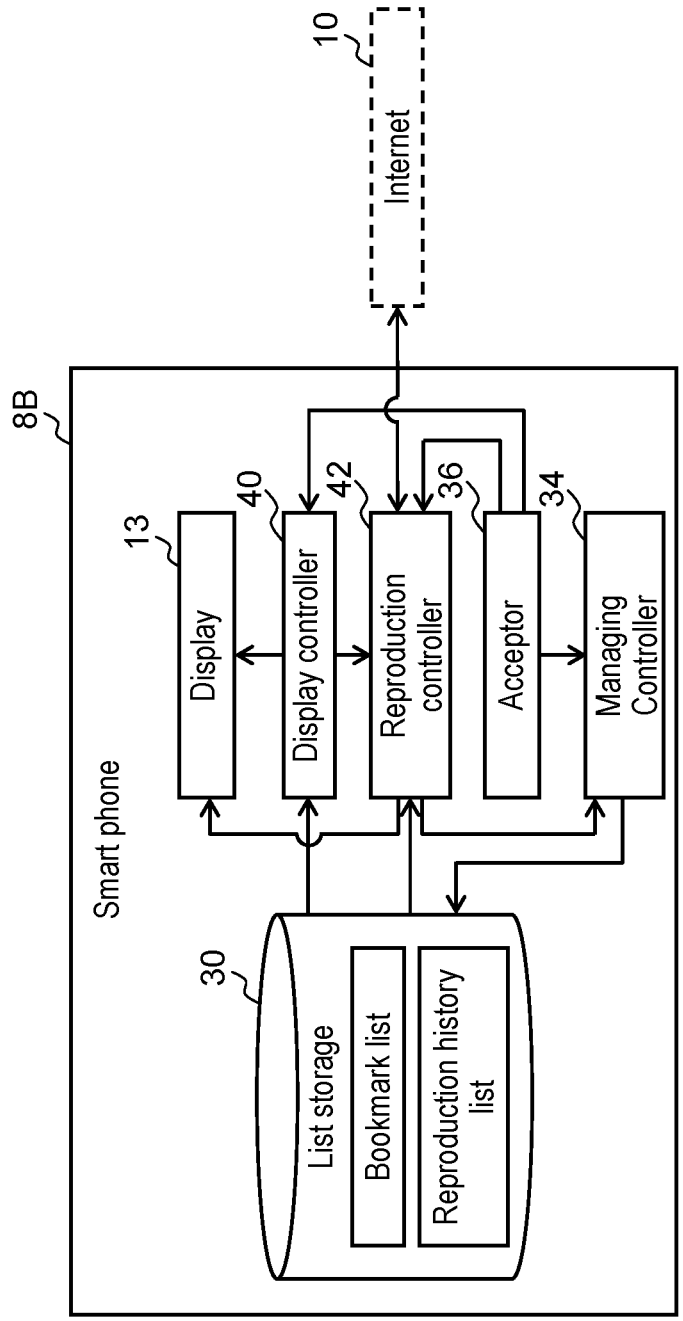
FIG. 17 is a block diagram schematically showing an example of a functional configuration of a smart phone in the third exemplary embodiment.

Next, a description is made of a functional configuration of smart phone 8B with reference to FIG. 17.

FIG. 17 is a block diagram schematically showing an example of a functional configuration of smart phone 8B in the third exemplary embodiment.

As shown in FIG. 17, smart phone 8B further includes: list storage 30; and managing controller 34 in addition to the constituent elements provided in smart phone 8 described in the first exemplary embodiment.

Note that smart phone 8B does not include acquisition unit 38 provided in smart phone 8 described in the first exemplary embodiment. This is because smart phone 8B has the functions of server 6 mentioned above.

List storage 30 and managing controller 34, which are provided in smart phone 8B, have substantially the same functions as list storage 30 and managing controller 34, which are provided in server 6 described in the first exemplary embodiment. Therefore, in this exemplary embodiment, a description of list storage 30 and managing controller 34, which are provided in smart phone 8B, is omitted.

[3-3. Operations of Content Reproduction System]

Next, operations of content reproduction system 2B will be described with reference to FIG. 18.

Figure 18:
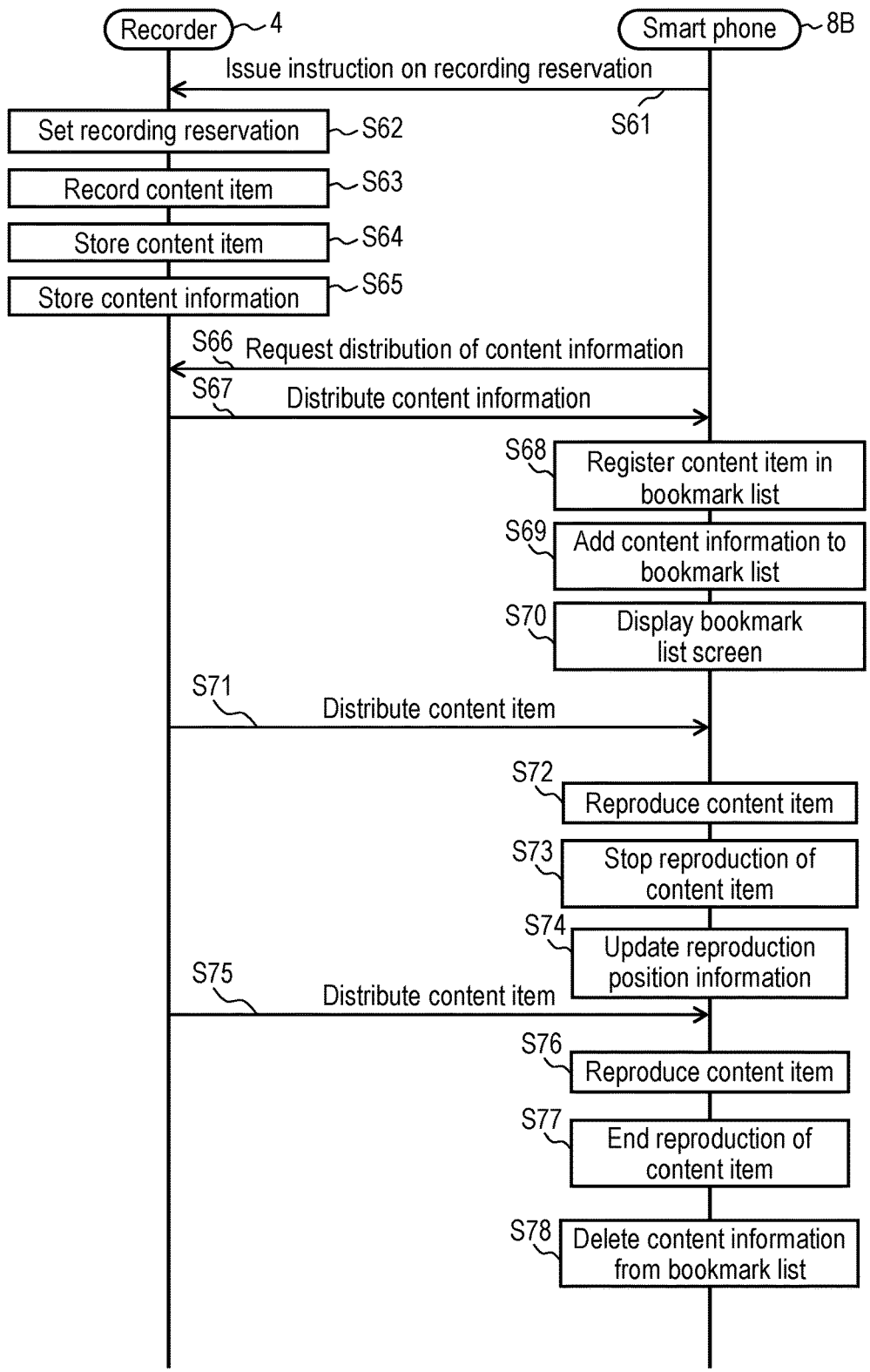
FIG. 18 is a sequence chart showing an example of a flow of operations of the content reproduction system in the third exemplary embodiment.

FIG. 18 is a sequence chart showing an example of a flow of operations of content reproduction system 2B in the third exemplary embodiment.

As shown in FIG. 18, first, Steps S61 to S65 are executed. Note that the respective steps which are Steps S61 to S65 perform substantially the same processing as the respective steps which are Steps S1 to S5 described with reference to FIG. 8 in the first exemplary embodiment, and accordingly, a description of Steps S61 to S65 is omitted.

Managing controller 34 of smart phone 8B requests recorder 4 to distribute the content information regarding the recorded content item (Step S66). This request from smart phone 8B to recorder 4 may be performed periodically.

In recorder 4 that has received this request, content information distributor 28 of recorder 4 reads the content information regarding the corresponding content item from content information storage 22, and distributes the read content information to smart phone 8B (Step S67).

It is assumed that, next, the user has performed a user's operation of registering a desired content item in the bookmark list on smart phone 8B. When the user's operation is accepted by acceptor 36 of smart phone 8B, the instruction that is based on the user's operation is sent from acceptor 36 to managing controller 34 of smart phone 8B (Step S68).

Note that the user's operation of registering the desired content item in the bookmark list is substantially the same as the operation described in the first exemplary embodiment, and accordingly, a description of the user's operation is omitted.

Managing controller 34 of smart phone 8B that has received this request adds the content information of the content item, which is distributed from recorder 4, to the bookmark list (Step S69).

It is assumed that, thereafter, the user has performed a user's operation of displaying bookmark list screen 46 (refer to FIG. 6) on smart phone 8B in order to view the content item registered in the bookmark list. When the user's operation is accepted by acceptor 36 of smart phone 8B, an application (software) for displaying bookmark list screen 46 (refer to FIG. 6) is activated in smart phone 8B. Moreover, an instruction that is based on the user's operation is sent from acceptor 36 to display controller 40 of smart phone 8B. In this way, display controller 40 of smart phone 8B allows display 13 to display bookmark list screen 46 based on the bookmark list stored in list storage 30 (Step S70).

It is assumed that, for example, the user has performed a user's operation for reproducing the content item of "Program B", which is registered in the bookmark list, by smart phone 8B. Note that this user's operation is substantially the same as the user's operation of Step S13, which is described in the first exemplary embodiment, and accordingly, a description of this user's operation is omitted. Then, it is assumed that the user has performed a user's operation of tapping reproduction button 62 by finger 44 on reproduction screen 52 (refer to FIG. 7) transitioned from bookmark list screen 46. When the user's operation is accepted by acceptor 36 of smart phone 8B, the instruction that is based on the user's operation is sent from acceptor 36 to reproduction controller 42 of smart phone 8B. In this way, a distribution request for the content item of "Program B" is transmitted from smart phone 8B to recorder 4. Recorder 4 that has received this request distributes the content item of "Program B" to smart phone 8B from content distributor 26 of recorder 4 (Step S71).

In this way, in smart phone 8B, the reproduction (streaming reproduction) of the content item of "Program B" is started (Step S72).

It is assumed that the user has performed the user's operation of tapping stop button 64 by finger 44 before the terminal end of the content item. When the user's operation is accepted by acceptor 36 of smart phone 8B, the instruction that is based on the user's operation is sent from acceptor 36 to reproduction controller 42 of smart phone 8B, and the reproduction of the content item is stopped (Step S73).

At this time, reproduction controller 42 of smart phone 8B issues a notice on the reproduction position update information to managing controller 34. Upon receiving the notice on the reproduction position update information from reproduction controller 42, managing controller 34 of smart phone 8B updates the reproduction position information, which is included in the bookmark list, based on the reproduction position update information (Step S74).

It is assumed that, thereafter, the user has performed the user's operation of tapping reproduction button 62 of reproduction screen 52 by finger 44 in a similar way to the above-mentioned case, for example, in order to reproduce the content item of "Program B", which is registered in the bookmark list, one more time. When the user's operation is accepted by acceptor 36 of smart phone 8B, the instruction that is based on the user's operation is sent from acceptor 36 to reproduction controller 42 of smart phone 8B. In this way, the distribution request for the content item of "Program B" and the reproduction position information of "Program B", which is registered in the bookmark list, are transmitted from smart phone 8B to recorder 4. From the reproduction position of which notice is issued, recorder 4 that has received this request distributes the content item of "Program B" to smart phone 8B from content distributor 26 of recorder 4 (Step S75).

In this way, on smart phone 8B, the content item of "Program B" is started from the updated reproduction position (Step S76).

When the content item of "Program B" is reproduced to the terminal end of the content item, the reproduction of the content item is finished (Step S77).

At this time, reproduction controller 42 of smart phone 8B notifies managing controller 34 that the reproduction of the content item is finished. In this way, managing controller 34 of smart phone 8B determines that the reproduction of the content item is finished, and deletes the content information regarding the content item of "Program B" from the bookmark list (Step S78).

Moreover, managing controller 34 of smart phone 8B adds the content information regarding the content item of "Program B" to a display history list.

[3-4. Effects and the Like]

As mentioned above, in this exemplary embodiment, the content reproduction system includes: a video recording apparatus for recording a content item; and a terminal apparatus for reproducing the content item. The video recording apparatus includes: a recorder; a content storage; a content information storage; a content distributor; and a content information distributor. The recorder records the content item in the content storage. The content storage stores the content item in accordance with an instruction from the recorder. The content information storage stores content information regarding the recorded content item. The content distributor distributes the content item, which is stored in the content storage, to the terminal apparatus. The content information distributor distributes the content information, which is stored in the content information storage, to the terminal apparatus. The terminal apparatus includes: a display; an acceptor that accepts an operation of a user; a list storage; a managing controller; a display controller; and a reproduction controller. The list storage stores a bookmark list. The bookmark list includes content information including reproduction position information indicating a reproduction position of the content item. The managing controller manages the bookmark list. The display controller allows the display to display a bookmark list screen indicating a list of the content information included in the bookmark list. In a case where the acceptor has accepted a user's operation of reproducing the content item, the reproduction controller starts reproduction of the content item from the reproduction position indicated by the reproduction position information. Moreover, in a case where the acceptor has accepted a user's operation of stopping the reproduction of the content item, the reproduction controller stops the reproduction of the content item, and notifies the managing controller of reproduction position update information indicating the updated reproduction position of the content item. Then, in a case of having been notified of the reproduction position update information from the reproduction controller, the managing controller of the terminal apparatus updates the reproduction position information, which is included in the bookmark list, based on the reproduction position update information.

Moreover, in a case of having determined that the reproduction of the content item is finished, the managing controller deletes content information regarding the content item from the bookmark list.

Note that content reproduction system 2B is an example of the content reproduction system. Recorder 4 is an example of the video recording apparatus. Smart phone 8B is an example of the terminal apparatus. Recorder 16 is an example of the recorder. Content storage 20 is an example of the content storage. Content information storage 22 is an example of the content information storage. Content distributor 26 is an example of the content distributor. Content information distributor 28 is an example of the content information distributor. Display 13 is an example of the display. Acceptor 36 is an example of the acceptor. List storage 30 is an example of the list storage. Managing controller 34 is an example of the managing controller. Display controller 40 is an example of the display controller. Reproduction controller 42 is an example of the reproduction controller. Bookmark list screen 46 is an example of the bookmark list screen.

For example, in a configuration example of content reproduction system 2B shown in the third exemplary embodiment, content reproduction system 2B includes: recorder 4 for recording the content item; and smart phone 8B for reproducing the content item. Recorder 4 includes: recorder 16; content storage 20; content information storage 22; content distributor 26; and a content information distributor 28. Recorder 16 records the content item in content storage 20. Content storage 20 stores the content item in accordance with an instruction from recorder 16. Content information storage 22 stores content information regarding the recorded content item. Content distributor 26 distributes the content item, which is stored in content storage 20, to smart phone 8B. Content information distributor 28 distributes the content information, which is stored in content information storage 22, to smart phone 8B. Smart phone 8B includes: display 13; acceptor 36 that accepts the operation of the user; list storage 30; managing controller 34; display controller 40; and reproduction controller 42. List storage 30 stores the bookmark list having the content information including the reproduction position information indicating the reproduction position of the content item. Managing controller 34 manages the bookmark list. Display controller 40 allows display 13 to display bookmark list screen 46 indicating a list of the content information included in the bookmark list. In a case where acceptor 36 has accepted a user's operation of reproducing the content item, reproduction controller 42 starts reproduction of the content item from the reproduction position indicated by the reproduction position information. Moreover, in a case where acceptor 36 has accepted a user's operation of stopping the reproduction of the content item, reproduction controller 42 stops the reproduction of the content item, and notifies managing controller 34 of reproduction position update information indicating the updated reproduction position of the content item. In a case of having been notified of the reproduction position update information from reproduction controller 42, managing controller 34 of smart phone 8B updates the reproduction position information, which is included in the bookmark list, based on the reproduction position update information. Moreover, in a case of having determined that the reproduction of the content item is finished, managing controller 34 deletes the content information regarding the content item from the bookmark list.

Moreover, in this exemplary embodiment, a content reproduction method is a content reproduction method in a content reproduction system including: a video recording apparatus for recording a content item; and a terminal apparatus for reproducing the content item. This content reproduction method includes: storing a content item as a recording target in a content storage of a video recording apparatus; storing content information regarding the recorded content item in a content information storage of the video recording apparatus; distributing the content information, which is stored in the content information storage, from the video recording apparatus to a terminal apparatus; storing a bookmark list, which has content information including reproduction position information indicating a reproduction position of the content item, in a list storage of the terminal apparatus; displaying a bookmark list screen, which indicates a list of the content information included in the bookmark list, on a display of the terminal apparatus; in a case where an acceptor of the terminal apparatus has accepted a user's operation of reproducing the content item, distributing the content item from the video recording apparatus to the terminal apparatus, and starting reproduction of the content item from a reproduction position, which is indicated by the reproduction position information; in a case where the acceptor has accepted a user's operation of stopping the reproduction of the content item, stopping the reproduction of the content item, and updating reproduction position information, which is included in the bookmark list, based on reproduction position update information indicating the updated reproduction position of the content item; and deleting the content information regarding the content item from the bookmark list in a case where it has been determined that the reproduction of the content item is finished.

For example, the content reproduction method shown as an example in the third exemplary embodiment is a content reproduction method in content reproduction system 2B including: recorder 4 for recording a content item; and smart phone 8B for reproducing the content item. This content reproduction method includes: storing a content item as a recording target in content storage 20 of recorder 4; storing content information regarding the recorded content item in content information storage 22 of recorder 4; distributing the content information, which is stored in content information storage 22, from recorder 4 to smart phone 8B; storing a bookmark list, which has content information including reproduction position information indicating a reproduction position of the content item, in list storage 30 of smart phone 8B; displaying bookmark list screen 46, which indicates a list of the content information included in the bookmark list, on display 13 of smart phone 8B; in a case where acceptor 36 of smart phone 8B has accepted a user's operation of reproducing the content item, distributing the content item from recorder 4 to smart phone 8B, and starting reproduction of the content item from a reproduction position, which is indicated by the reproduction position information; in a case where acceptor 36 has accepted a user's operation of stopping the reproduction of the content item, stopping the reproduction of the content item, and updating reproduction position information, which is included in the bookmark list, based on reproduction position update information indicating the updated reproduction position of the content item; and deleting the content information regarding the content item from the bookmark list in a case where it has been determined that the reproduction of the content item is finished.

In this way, the functions of server 6, which are described in the first exemplary embodiment, can be imparted to smart phone 8B.

In the content reproduction system, the managing controller of the terminal apparatus may determine that the reproduction of the content item has been finished in a case where the content item is reproduced to the terminal end of the content item.

For example, in the configuration example of content reproduction system 2B shown in the third exemplary embodiment, managing controller 34 of smart phone 8B determines that the reproduction of the content item has been finished in the case where the content item is reproduced to the terminal end of the content item.

In this way, managing controller 34 of smart phone 8B can determine that the reproduction of the content item is finished in a case where the user has viewed the content item to the terminal end of the content item.

In the content reproduction system, the managing controller of the terminal apparatus may determine that the reproduction of the content item is finished in a case where the residual reproduction time of the content item is the predetermined time or less and the ratio of the residual reproduction time to the total reproduction time of the content item is the predetermined value or less at the point of time when the acceptor of the terminal apparatus accepts the user's operation of stopping the reproduction of the content item.

For example, in the configuration example of content reproduction system 2B shown in the third exemplary embodiment, managing controller 34 of smart phone 8B determines that the reproduction of the content item is finished in the case where the residual reproduction time of the content item is the predetermined time or less and the ratio of the residual reproduction time to the total reproduction time of the content item is the predetermined value or less at the point of time when acceptor 36 of smart phone 8B accepts the user's operation of stopping the reproduction of the content item.

In this way, managing controller 34 of smart phone 8B can determine that the reproduction of the content item is finished in a case where the user has viewed the content item to a vicinity of the terminal end of the content item.

In the content reproduction system, the list storage of the terminal apparatus may further store the reproduction history list including the content information regarding the content items of which reproduction is finished. In the case of having determined that the reproduction of the content item is finished, the managing controller of the terminal apparatus may delete content information regarding the content item from the bookmark list, and in addition, may add the content information to the reproduction history list.

For example, in the configuration example of content reproduction system 2B shown in the third exemplary embodiment, list storage 30 of smart phone 8B further stores the reproduction history list including the content information regarding the content items of which reproduction is finished. In the case of having determined that the reproduction of the content item is finished, managing controller 34 of smart phone 8B deletes the content information regarding the content item from the bookmark list, and in addition, adds the content information to the reproduction history list.

In this way, even in a case where the content information is deleted from the bookmark list, the user can reproduce the content item corresponding to the content information from the reproduction history list screen.

In the content reproduction system, the managing controller of the terminal apparatus may add the content information regarding the content item to the bookmark list in response to that the acceptor of the terminal apparatus accepts the user's operation of selecting the content item.

For example, in the configuration example of content reproduction system 2B shown in the third exemplary embodiment, managing controller 34 of smart phone 8B adds the content information regarding the content item to the bookmark list in response to that acceptor 36 of smart phone 8B accepts the user's operation of selecting the content item.

In this way, the user can register the content item in the bookmark list by using smart phone 8B.

In the content reproduction system, the managing controller of the terminal apparatus may add the content information regarding the content item to the bookmark list in response to that the acceptor of the terminal apparatus accepts the user's operation of selecting the content item in a state where the content item is reproduced.

For example, in the configuration example of content reproduction system 2B shown in the third exemplary embodiment, managing controller 34 of smart phone 8B adds the content information regarding the content item to the bookmark list in response to that acceptor 36 of smart phone 8B accepts the user's operation of selecting the content item in the state where the content item is reproduced.

In this way, the user can register the content item in the bookmark list by using smart phone 8B even if the content is under reproduction.

In the content reproduction system, the acceptor of the terminal apparatus may be capable of accepting the user's operation of selecting the content item in a state where the recording reservation screen for reserving the recording of the content item is displayed on the display. The managing controller of the terminal apparatus may add the content information regarding the content item in the bookmark list in a case where the recording of the content item is completed.

Note that recording reservation screen 78 is an example of the recording reservation screen.

For example, in the configuration example of content reproduction system 2B shown in the third exemplary embodiment, acceptor 36 of smart phone 8B is capable of accepting the user's operation of selecting the content item in a state where recording reservation screen 78 for reserving the recording of the content item is displayed on display 13. Managing controller 34 of smart phone 8B adds the content information regarding the content item to the bookmark list in the case where the recording of the content item is completed.

In this way, in a case of performing the recording reservation for the content item, the user can perform an operation for registering the content item in the bookmark list.

Fourth Exemplary Embodiment

[4-1. Overall Configuration of Content Reproduction System]

Figure 19:
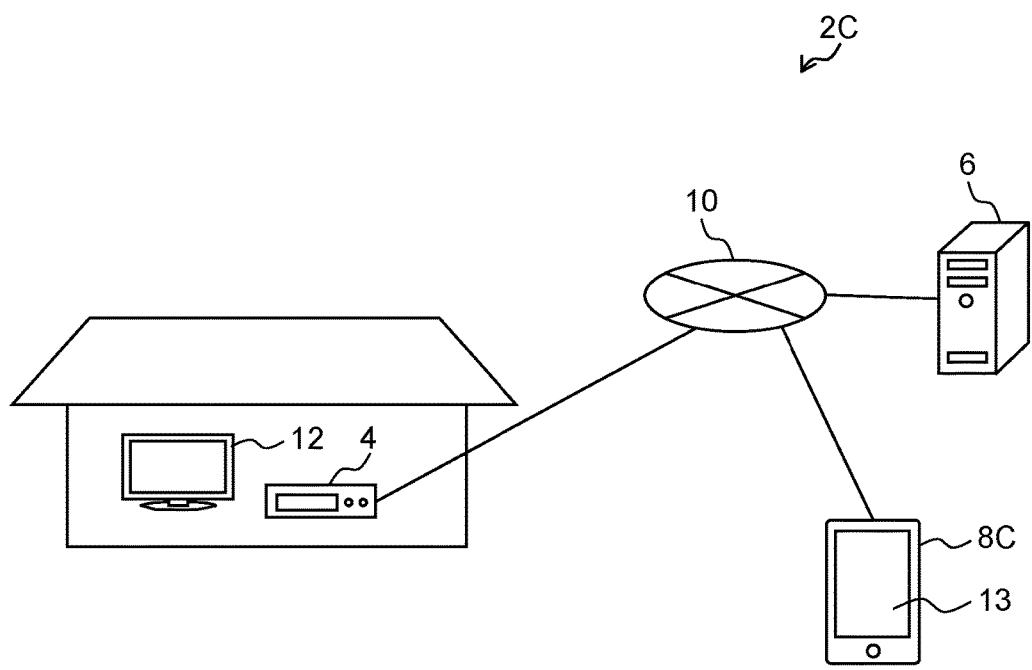
FIG. 19 is a diagram schematically showing a configuration example of a content reproduction system in a fourth exemplary embodiment.

Next, a description is made of an overall configuration of content reproduction system 2C in a fourth exemplary embodiment with reference to FIG. 19.

FIG. 19 is a diagram schematically showing a configuration example of content reproduction system 2C in the fourth exemplary embodiment.

As shown in FIG. 19, content reproduction system 2C of this exemplary embodiment includes: recorder 4; server 6; and smart phone 8C. In comparison with content reproduction system 2 described in the first exemplary embodiment, a configuration of smart phone 8C in content reproduction system 2C of this exemplary embodiment is different from that of smart phone 8 of the first exemplary embodiment.

Note that recorder 4 and server 6, which are shown in the fourth exemplary embodiment, have substantially the same configurations as recorder 4 and server 6, which are shown in the first exemplary embodiment, and accordingly, a description of recorder 4 and server 6, which are shown in the fourth exemplary embodiment, is omitted.

[4-2. Functional Configuration of Smart Phone]

Figure 20:
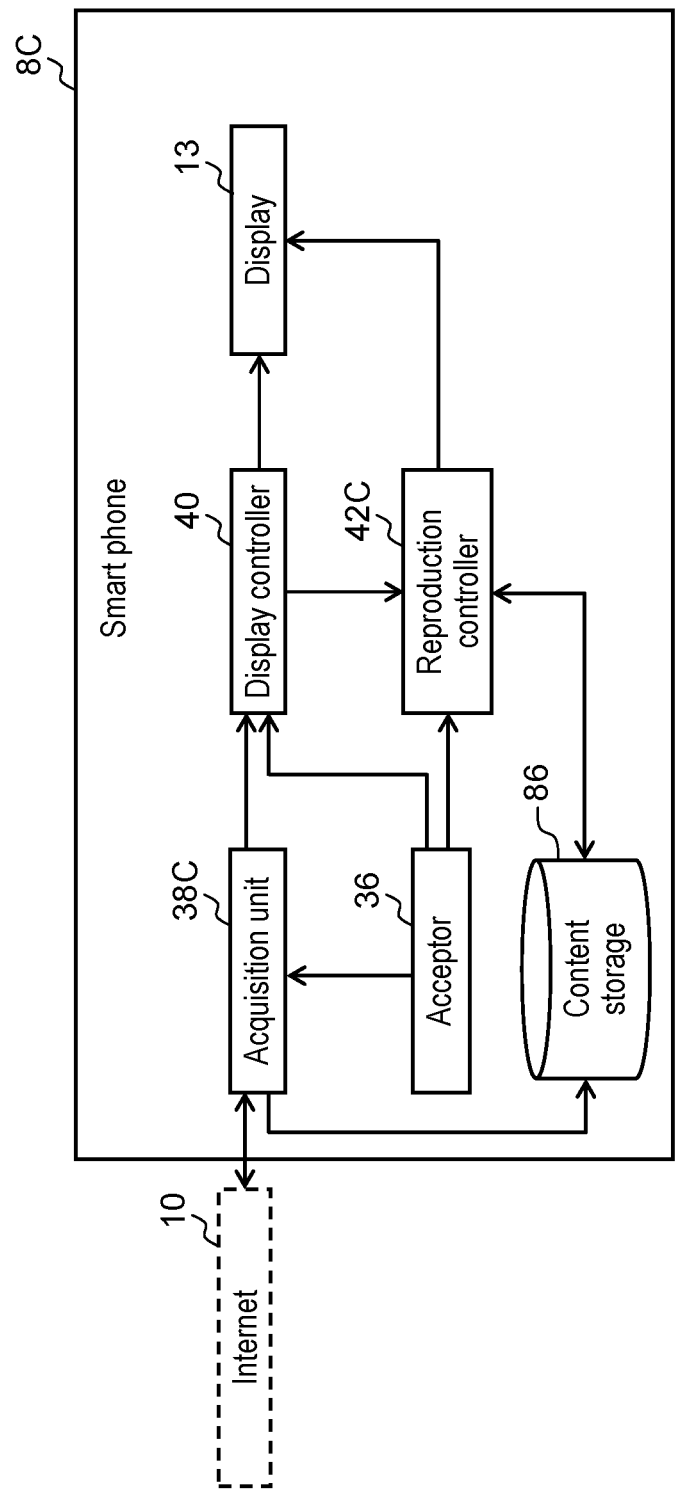
FIG. 20 is a block diagram schematically showing an example of a functional configuration of a smart phone in the fourth exemplary embodiment.

Next, a description is made of a functional configuration of smart phone 8C with reference to FIG. 20.

FIG. 20 is a block diagram schematically showing an example of a functional configuration of smart phone 8C in the fourth exemplary embodiment.

As shown in FIG. 20, smart phone 8C further includes content storage 86 in addition to the constituent elements provided in smart phone 8 described in the first exemplary embodiment.

Content storage 86 stores a content item acquired by acquisition unit 38C.

Acquisition unit 38C of smart phone 8C performs substantially the same operations as acquisition unit 38 of smart phone 8 shown in the first exemplary embodiment; however, is configured to further perform the following operations. That is, in a case where the bookmark list is distributed from server 6 to smart phone 8C, acquisition unit 38C requests recorder 4 to distribute a content item registered in the bookmark list, and acquires the content item distributed from recorder 4 in response to such a request.

Reproduction controller 42C of smart phone 8C performs substantially the same operations as reproduction controller 42 of smart phone 8 shown in the first exemplary embodiment; however, is configured to further perform the following operations. That is, in a case where content information is deleted from the bookmark list, reproduction controller 42C deletes a content item, which corresponds to the content information, from content storage 86.

[4-3. Operations of Content Reproduction System]

Next, operations of content reproduction system 2C will be described with reference to FIG. 21.

Figure 21:
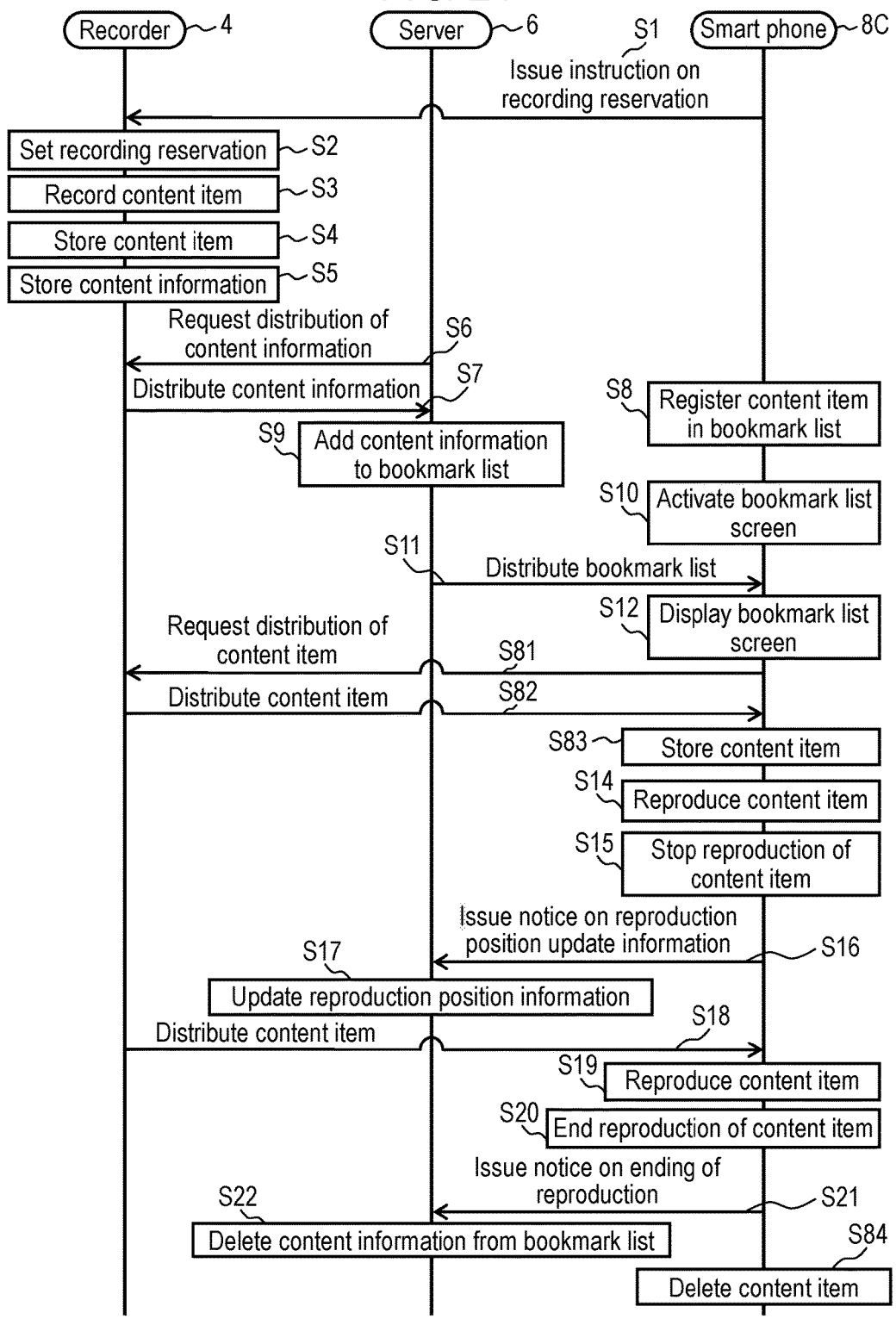
FIG. 21 is a sequence chart showing an example of a flow of operations of the content reproduction system in the fourth exemplary embodiment.

FIG. 21 is a sequence chart showing an example of a flow of operations of content reproduction system 2C in the fourth exemplary embodiment.

Note that, in FIG. 21, to steps where substantially the same processing as the steps of the flowchart shown in FIG. 8 is executed, the same step numbers as step numbers of these steps are assigned, and a description of the steps concerned is omitted.

As shown in FIG. 21, after Steps S1 to S12, which are substantially the same as Steps S1 to S12, which are described in the first exemplary embodiment, are executed, acquisition unit 38C of smart phone 8C requests recorder 4 to distribute a content item registered in the bookmark list (Step S81).

Recorder 4 that has received such a request distributes the content item, which is registered in the bookmark list, from content distributor 26 (refer to FIG. 2) of recorder 4 to smart phone 8C (Step S82).

Acquisition unit 38C of smart phone 8C acquires the content item distributed from recorder 4. Then, content storage 86 of smart phone 8C stores the content item acquired by acquisition unit 38C (Step S83).

When the user performs a user's operation of reproducing the content item from bookmark list screen 46 (refer to FIG. 6), and this user's operation is accepted by acceptor 36 of smart phone 8C, an instruction that is based on the user's operation is sent from acceptor 36 to reproduction controller 42C of smart phone 8C. Reproduction controller 42C that has received the instruction reads the content item from content storage 86 based on the instruction, and reproduces the read content item (Step S14).

Note that the user's operation of reproducing a desired content item from bookmark list screen 46 is substantially the same as the operation described in the first exemplary embodiment, and accordingly, a description of the user's operation is omitted.

After Step S14 is finished, Steps S15 to S22, which are substantially the same as Steps S15 to S22 described in the first exemplary embodiment, are executed.

Then, after Step S22 is executed, reproduction controller 42C of smart phone 8C deletes a content item, which corresponds to content information deleted from the bookmark list, from content storage 86 (Step S84).

Note that timing of distributing the content item from recorder 4 to smart phone 8C (that is, timing when Step S82 is executed) may be immediately after the bookmark list is distributed from server 6 to smart phone 8C. However, the present disclosure may not be limited to this operation. For example, after the bookmark list is distributed from server 6 to smart phone 8C, the content item may be distributed from recorder 4 to smart phone 8C during a night time period while it is highly possible that the user may be asleep.

[4-4. Effects and the Like]

As mentioned above, in this exemplary embodiment, the content reproduction system includes: a server; and a terminal apparatus for reproducing a content item. The server includes: a list storage; and a managing controller. The list storage stores a bookmark list. The bookmark list includes content information including reproduction position information indicating a reproduction position of the content item. The managing controller manages the bookmark list. The terminal apparatus includes: a display; an acceptor that accepts an operation of a user; an acquisition unit that acquires the bookmark list from the server; a content storage; a display controller; and a reproduction controller. The content storage stores a content item corresponding to content information included in a bookmark list, the content item being distributed from an external apparatus. The display controller allows the display to display a bookmark list screen indicating a list of the content information included in the bookmark list. In a case where the acceptor has accepted a user's operation of reproducing the content item, the reproduction controller starts reproduction of the content item, which is stored in the content storage, from a reproduction position indicated by the reproduction position information. Moreover, in a case where the acceptor has accepted a user's operation of stopping the reproduction of the content item, the reproduction controller stops the reproduction of the content item, and notifies the managing controller of reproduction position update information indicating the updated reproduction position of the content item. Then, in a case of having been notified of the reproduction position update information from the reproduction controller of the terminal apparatus, the managing controller of the server updates the reproduction position information, which is included in the bookmark list, based on the reproduction position update information. Then, the managing controller of the server allows the display of the terminal apparatus to display the updated reproduction position information.

Note that content reproduction system 2C is an example of the content reproduction system. Server 6 is an example of the server. Smart phone 8C is an example of the terminal apparatus. List storage 30 is an example of the list storage. Managing controller 34 is an example of the managing controller. Display 13 is an example of the display. Acceptor 36 is an example of the acceptor. Acquisition unit 38C is an example of the acquisition unit. Content storage 86 is an example of the content storage. Display controller 40 is an example of the display controller. Reproduction controller 42C is an example of the reproduction controller. Bookmark list screen 46 is an example of the bookmark list screen.

For example, in a configuration example of content reproduction system 2C shown in the fourth exemplary embodiment, content reproduction system 2C includes: server 6; and smart phone 8C for reproducing the content item. Server 6 includes: list storage 30; and managing controller 34. List storage 30 stores the bookmark list having content information including reproduction position information indicating a reproduction position of a content item. Managing controller 34 manages the bookmark list. Smart phone 8C includes: display 13; acceptor 36 that accepts an operation of a user; acquisition unit 38C that acquires the bookmark list from server 6; content storage 86; display controller 40; and reproduction controller 42C. Content storage 86 stores a content item corresponding to content information included in a bookmark list, the content item having being distributed from recorder 4. Display controller 40 allows display 13 to display bookmark list screen 46 indicating a list of the content information included in the bookmark list. In a case where acceptor 36 has accepted a user's operation of reproducing the content item, reproduction controller 42C starts reproduction of the content item, which is stored in content storage 86, from a reproduction position indicated by the reproduction position information. Moreover, in a case where acceptor 36 has accepted a user's operation of stopping the reproduction of the content item, reproduction controller 42C stops the reproduction of the content item, and notifies managing controller 34 of reproduction position update information indicating the updated reproduction position of the content item. In a case of having been notified of the reproduction position update information from reproduction controller 42C of smart phone 8C, managing controller 34 of server 6 updates the reproduction position information, which is included in the bookmark list, based on the reproduction position update information.

In this way, smart phone 8C can previously capture the content item, which is registered in the bookmark list, into smart phone 8C by background processing. Hence, in a case where the user reproduces the content item, which is registered in the bookmark list, on smart phone 8C, the content item previously captured into smart phone 8C is reproduced on smart phone 8C. In this way, for example, even in a region where a reception state of a radio wave is unfavorable, smart phone 8C can reproduce the content item while reducing a phenomenon that the content item is interrupted halfway.

In the content reproduction system, in the case where the content information has been deleted from the bookmark list, the reproduction controller of the terminal apparatus may delete the content item, which corresponds to the content information, from the content storage.

For example, in the configuration example of content reproduction system 2C shown in the fourth exemplary embodiment, reproduction controller 42C of smart phone 8C deletes the content item, which corresponds to the content information, from content storage 86, in the case where the content information has been deleted from the bookmark list.

In this way, a user's operation of deleting the content item from smart phone 8C can be omitted, and accordingly, the convenience for the user can be enhanced.

Fifth Exemplary Embodiment

[5-1. Overall Configuration of Content Reproduction System]

Figure 22:
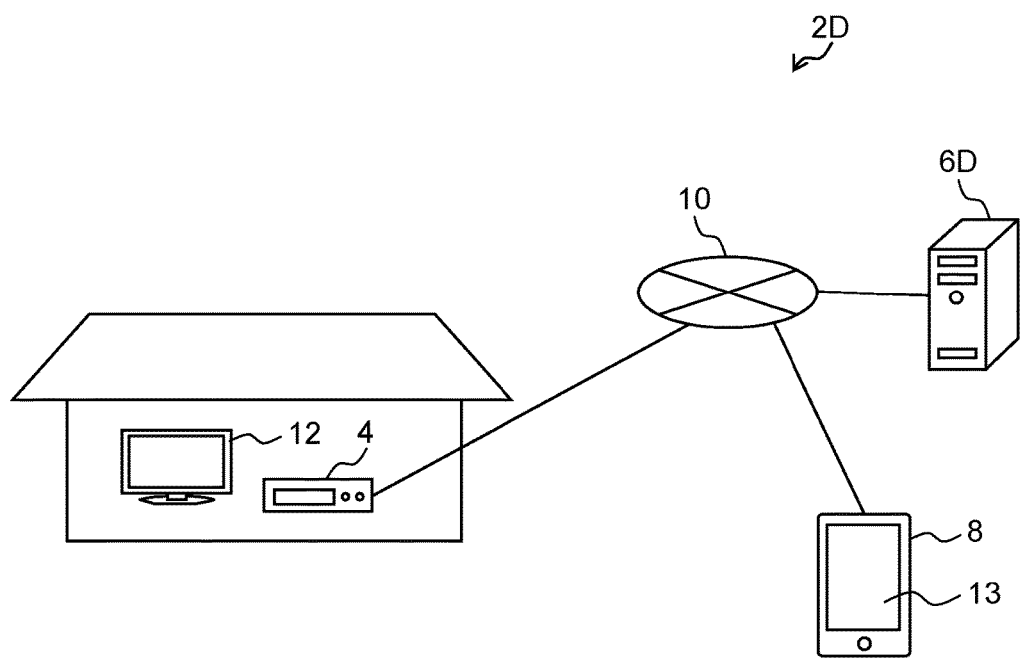
FIG. 22 is a diagram schematically showing a configuration example of a content reproduction system in a fifth exemplary embodiment.

Next, a description is made of an overall configuration of content reproduction system 2D in a fifth exemplary embodiment with reference to FIG. 22.

FIG. 22 is a diagram schematically showing a configuration example of content reproduction system 2D in the fifth exemplary embodiment.

As shown in FIG. 22, content reproduction system 2D of this exemplary embodiment includes: recorder 4; server 6D; and smart phone 8. In comparison with content reproduction system 2 described in the first exemplary embodiment, a configuration of server 6D in content reproduction system 2D of this exemplary embodiment is different from that of server 6 of the first exemplary embodiment.

Note that recorder 4 and smart phone 8, which are shown in the fifth exemplary embodiment, have substantially the same configurations as recorder 4 and smart phone 8, which are shown in the first exemplary embodiment, and accordingly, a description of recorder 4 and smart phone 8, which are shown in the fifth exemplary embodiment, is omitted.

[5-2. Functional Configuration of Server]

Figure 23:
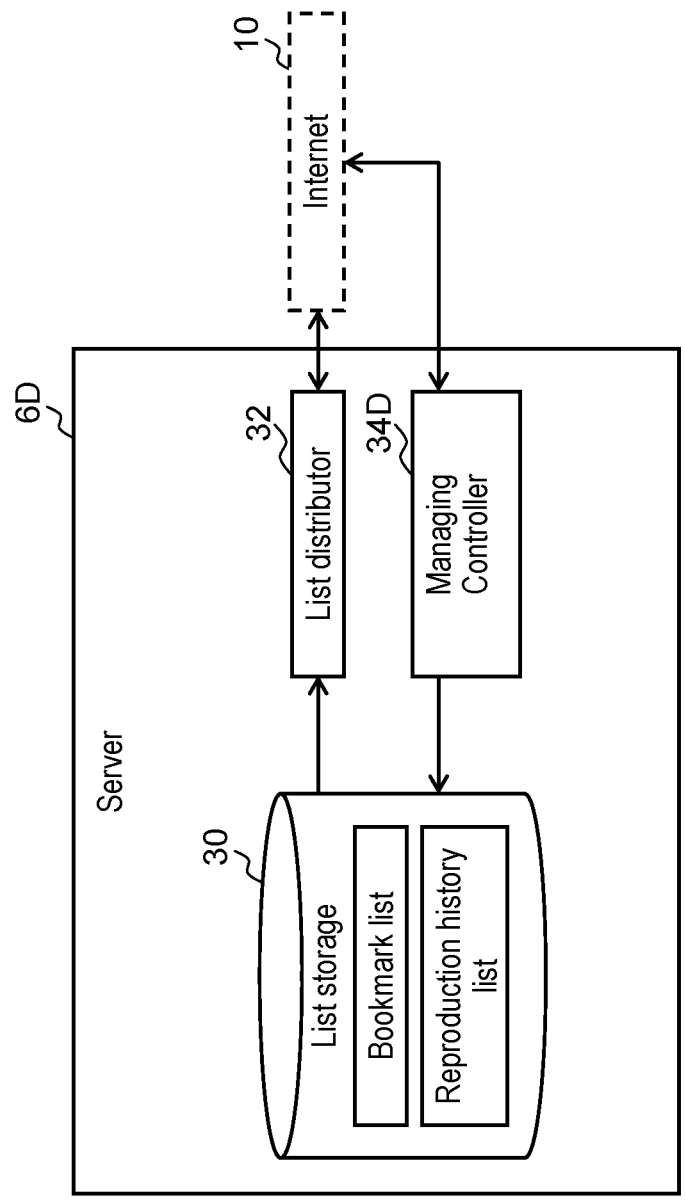
FIG. 23 is a block diagram schematically showing an example of a functional configuration of a server in the fifth exemplary embodiment.

Next, a description is made of a functional configuration of server 6D with reference to FIG. 23.

FIG. 23 is a block diagram schematically showing an example of a functional configuration of server 6D in the fifth exemplary embodiment.

As shown in FIG. 23, server 6D has substantially the same configuration as server 6 described in the first exemplary embodiment. However, managing controller 34D provided in server 6D is different from managing controller 34 provided in server 6 in a point of further performing the following operation.

In the case where the reproduction position information is updated, managing controller 34D of server 6D instructs smart phone 8 to display the updated reproduction position information on display 13.

[5-3. Operations of Content Reproduction System]

Next, operations of content reproduction system 2D will be described with reference to FIG. 24 and FIG. 25.

Figure 24:
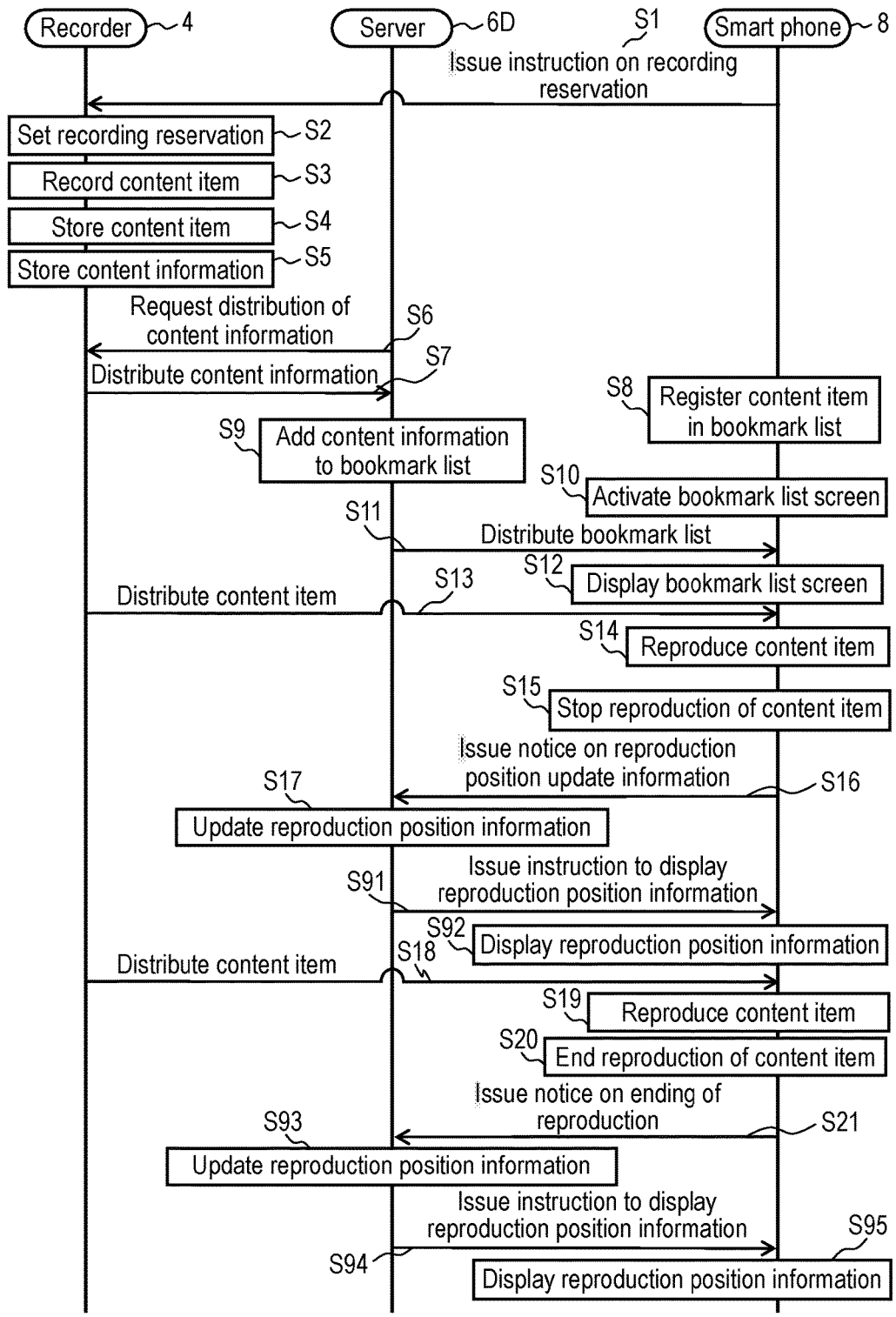
FIG. 24 is a sequence chart showing an example of a flow of operations of the content reproduction system in the fifth exemplary embodiment.

FIG. 24 is a sequence chart showing an example of a flow of operations of content reproduction system 2D in the fifth exemplary embodiment.

Figure 25:
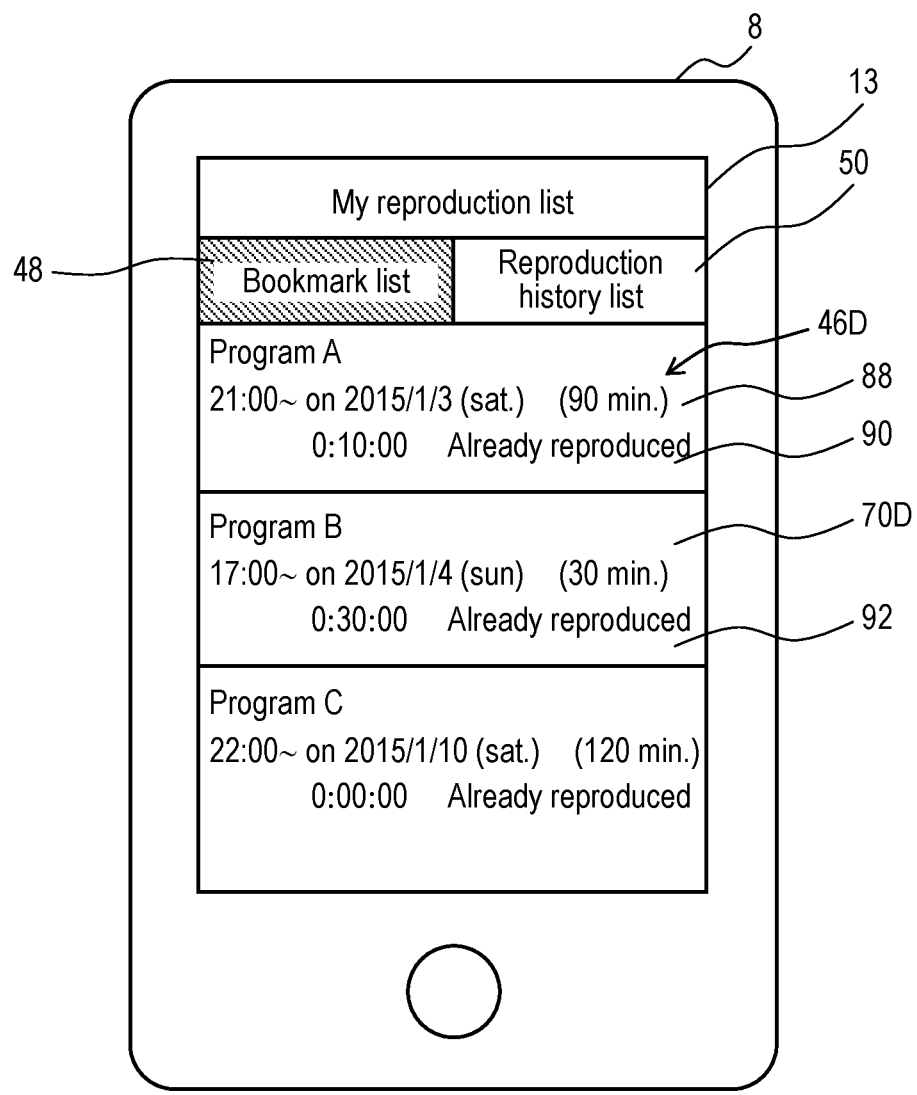
FIG. 25 is a diagram showing an example of a bookmark list screen displayed on a smart phone in the fifth exemplary embodiment.

FIG. 25 is a diagram showing an example of bookmark list screen 46D displayed on smart phone 8 in the fifth exemplary embodiment.

Note that, in FIG. 24, to steps where substantially the same processing as the steps of the flowchart shown in FIG. 8 is executed, the same step numbers as step numbers of these steps are assigned, and a description of the steps concerned is omitted.

As shown in FIG. 24, after Steps S1 to S17, which are substantially the same as Steps S1 to S17 described in the first exemplary embodiment, are executed, managing controller 34D of server 6D instructs smart phone 8 to display the updated reproduction position information on display 13 (Step S91).

Display controller 40 of smart phone 8 displays the updated reproduction position information on display 13 based on the instruction from managing controller 34D of server 6D (Step S92).

An example of the reproduction position information displayed on display 13 of smart phone 8 in Step S92 is shown in FIG. 25. For example, it is assumed that the updated reproduction position of the content item of "Program A" is "0 hour 10 minutes 00 second" in the case where the reproduction of the content item is stopped. In that case, as shown in FIG. 25, display controller 40 of smart phone 8 displays display 90 (for example, "0:10:00 already reproduced" as a character string), which indicates the reproduction position information, on display 88 of the content item of "Program A" on bookmark list screen 46D.

After Step S92 is finished, Steps S18 to S21, which are substantially the same as Steps S18 to S21 described in the first exemplary embodiment, are executed.

After Step S21 is executed, managing controller 34D of server 6D updates the reproduction position information, which is included in the bookmark list, based on a notice from smart phone 8 (Step S93).

Thereafter, managing controller 34D of server 6D instructs smart phone 8 to display the updated reproduction position information on display 13 (Step S94).

Display controller 40 of smart phone 8 displays the updated reproduction position information on display 13 based on the instruction from managing controller 34D of server 6D (Step S95).

An example of the updated reproduction position information displayed on display 13 of smart phone 8 in Step S95 is shown in FIG. 25. For example, it is assumed that the updated reproduction position of the content item of "Program B" is "0 hour 30 minutes 00 second" in the case where the reproduction of the content item is finished. In that case, as shown in FIG. 25, display controller 40 of smart phone 8 displays display 92 (for example, "0:30:00 already reproduced" as a character string), which indicates the reproduction position information, on display 70D of the content item of "Program B" on bookmark list screen 46D (Step S95).

Note that, in this exemplary embodiment, in a case where the reproduction of the content item is finished, managing controller 34D of server 6D does not delete content information regarding the content item from the bookmark list.

Note that, in this exemplary embodiment, the description is made of the operation example where the updated reproduction position information is displayed on bookmark list screen 46D; however, the present disclosure may not be limited to this operation. For example, the bookmark list in the table format, which is as shown in FIG. 4, may be displayed on display 13, and the updated reproduction position information may be displayed on this bookmark list.

[5-4. Effects and the Like]

As mentioned above, in this exemplary embodiment, the content reproduction system includes: a server; and a terminal apparatus for reproducing a content item. The server includes: a list storage; and a managing controller. The list storage stores a bookmark list. The bookmark list includes content information including reproduction position information indicating a reproduction position of the content item. The managing controller manages the bookmark list. The terminal apparatus includes: a display; an acceptor that accepts an operation of a user; an acquisition unit that acquires the bookmark list from the server; a display controller; and a reproduction controller. The display controller allows the display to display a bookmark list screen indicating a list of the content information included in the bookmark list. In a case where the acceptor has accepted a user's operation of reproducing the content item, the reproduction controller starts reproduction of the content item from the reproduction position indicated by the reproduction position information. Moreover, in a case where the acceptor has accepted a user's operation of stopping the reproduction of the content item, the reproduction controller stops the reproduction of the content item, and notifies the managing controller of reproduction position update information indicating the updated reproduction position of the content item. Then, in a case of having been notified of the reproduction position update information from the reproduction controller of the terminal apparatus, the managing controller of the server updates the reproduction position information, which is included in the bookmark list, based on the reproduction position update information. Moreover, the managing controller of the server allows the display of the terminal apparatus to display the updated reproduction position information.

Note that content reproduction system 2D is an example of the content reproduction system. Server 6D is an example of the server. Smart phone 8 is an example of the terminal apparatus. List storage 30 is an example of the list storage. Managing controller 34D is an example of the managing controller. Display 13 is an example of the display. Acceptor 36 is an example of the acceptor. Acquisition unit 38 is an example of the acquisition unit. Display controller 40 is an example of the display controller. Reproduction controller 42 is an example of the reproduction controller. Bookmark list screen 46D is an example of the bookmark list screen.

For example, in a configuration example of content reproduction system 2D shown in the fifth exemplary embodiment, content reproduction system 2D includes: server 6D; and smart phone 8 for reproducing the content item. Server 6D includes: list storage 30; and managing controller 34D. List storage 30 stores the bookmark list having content information including reproduction position information indicating a reproduction position of a content item. Managing controller 34D manages the bookmark list. Smart phone 8 includes: display 13; acceptor 36 that accepts an operation of a user; acquisition unit 38 that acquires the bookmark list from server 6D; display controller 40; and reproduction controller 42. Display controller 40 allows display 13 to display bookmark list screen 46D indicating a list of the content information included in the bookmark list. In a case where acceptor 36 has accepted a user's operation of reproducing the content item, reproduction controller 42 starts reproduction of the content item from the reproduction position indicated by the reproduction position information. Moreover, in a case where acceptor 36 has accepted a user's operation of stopping the reproduction of the content item, reproduction controller 42 stops the reproduction of the content item, and notifies managing controller 34D of reproduction position update information indicating the updated reproduction position of the content item. In a case of having been notified of the reproduction position update information from reproduction controller 42 of smart phone 8, managing controller 34D of server 6D updates the reproduction position information, which is included in the bookmark list, based on the reproduction position update information. Moreover, managing controller 34D of server 6D allows display 13 of smart phone 8 to display the updated reproduction position information.

In this way, the user can easily perceive the reproduction position of the content item registered in the bookmark list.

Other Exemplary Embodiments

As described above, the description is made of the first to fifth exemplary embodiments as illustration of the technique disclosed in the present application. However, the technique in the present disclosure is not limited thereto, and is also applicable to exemplary embodiments corresponding to alteration, replacement, addition, omission, and the like. Moreover, it is also possible to form new exemplary embodiments by combining the respective constituent elements described in the first to fifth exemplary embodiments.

Accordingly, other exemplary embodiments will be illustrated below.

In the first to fourth exemplary embodiments, the description has been made of the operation example where managing controller 34 determines that the reproduction of the content item is finished in the case where the content item is reproduced to the terminal end of the content item. However, the present disclosure is not limited to this operation. For example, managing controller 34 may determine that the reproduction of the content item is finished in a case where a CM (Commercial Message: for example, a CM broadcasted after an ending of a broadcast program) in a vicinity of the terminal end of the content item is reproduced at the point of time when acceptor 36 has accepted the user's operation of stopping the reproduction of the content item. In this case, managing controller 34 may determine whether or not the reproduction of the content item is finished based on CM information distributed from server 6 or the like.

In the exemplary embodiment, the description is made of the operation example where the content item is reproduced on smart phone 8 (8B, 8C) from bookmark list screen 46 (46D). However, the present disclosure is not limited to this operation. For example, the content item may be reproduced on recorder 4 (4A) from the bookmark list screen. In this case, when the reproduction of the content item is stopped in recorder 4 (4A), the reproduction position information of the bookmark list may be updated in the same way as mentioned above.

In each of the exemplary embodiments, the configuration example where the content item is defined to be a broadcast program is shown. However, the present disclosure is not limited to this configuration. For example, the content item may be a content item on Video On Demand such as YouTube (registered trademark) and Netflix (registered trademark).

In each of the exemplary embodiments, the description is made of the configuration example where the terminal apparatus is defined to be smart phone 8 (8B, 8C). However, the present disclosure is not limited to this configuration. For example, the terminal apparatus may be a tablet terminal, a notebook personal computer or the like.

In each of the exemplary embodiments, the description is made of the case where content reproduction system 2 (2A, 2B, 2C, 2D) is used by one user. However, content reproduction system 2 (2A, 2B, 2C, 2D) may be used by a plurality of the users. In this case, the bookmark list may be managed for each of the users in server 6 and the like. Moreover, in a case where the plurality of users use content reproduction system 2 (2A, 2B, 2C, 2D), each of the users may perform a log-in operation by smart phone 8 (8B, 8C).

For example, content reproduction system 2 (2A, 2B, 2C, 2D) may be configured so that the content item, which is registered in the bookmark list, cannot be deleted by mistake in the case where the user operates recorder 4 (4A). At this time, a warning message may be displayed on television receiver 12 or the like.

For example, in a case where a content item in which broadcast programs of all channels for an amount of a predetermined number of days (for example, an amount of three weeks) are recorded is registered in the bookmark list by the user, the content item concerned may be automatically copied in another storage area than content storage 20 of recorder 4 (4A) so that a head of the content item concerned cannot be overwritten.

Alternatively, a warning message may be transmitted from recorder 4 (4A) to smart phone 8 (8B, 8C) before the head of the content concerned is overwritten.

In a case where smart phone 8 is an individual terminal, the updated reproduction position information may be stored in only server 6 as described in the first exemplary embodiment when the content item is registered in the bookmark list by the user. Meanwhile, in a case where smart phone 8 is a shared terminal, the updated reproduction position information may be stored not in server 6 but in recorder 4 when the content item is registered in the bookmark list by the user.

The server may be a video recording apparatus for recording a content item. In addition to functions as a server computer, the server may further include: a recorder that records the content item in a content storage; the content storage that stores the content item in accordance with an instruction of the recorder; a content information storage that stores content information regarding the recorded content item; and a content distributor that distributes the content item, which is stored in the content storage, to a terminal apparatus in a case where an acceptor of the terminal apparatus has accepted a user's operation of reproducing the content item.

Note that these comprehensive or specific aspects may be realized by a system, an apparatus, an integrated circuit, a computer program or a recording medium such as a computer-readable CD-ROM, or may be realized by an arbitrary combination of the system, the apparatus, the integrated circuit, the computer program and the recording medium.

As described above, the description is made of the exemplary embodiments as illustration of the technique in the present disclosure. For this purpose, the accompanying drawings and the detailed description are provided.

Hence, the constituent elements described in the accompanying drawings and the detailed description can include not only constituent elements which are essential for solving the problem, but also constituent elements, which are provided for illustrating the above-described technique, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for illustrating the technique in the present disclosure, and accordingly, can be corresponding to varieties of alterations, replacements, additions, omissions, and the like within the scope of patent claims or within the scope of equivalents thereof. For example, the above-described respective exemplary embodiments may be arbitrary combined with one another.

INDUSTRIAL APPLICABILITY

The present disclosure is applicable to a content reproduction system including: a server; and a terminal apparatus for reproducing a content item.

REFERENCE MARKS IN THE DRAWINGS 2, 2A, 2B, 2C, 2D: content reproduction system
4, 4A: recorder
6, 6D: server
8, 8B, 8C: smart phone
10: Internet
12: television receiver
13: display
14: tuner
16: recorder
18: record reserving controller
20: content storage
22: content information storage
24: reproducer
26: content distributor 28: content information distributor
30: list storage
32: list distributor
34, 34D: managing controller
36: acceptor
38, 38C: acquisition unit
40: display controller
42, 42C: reproduction controller
44: finger
46, 46D: bookmark list screen
48, 50: tab
52: reproduction screen
54: icon
56, 58: menu
60: display area
62: reproduction button
64: stop button
66: recording list screen
68, 70, 70D, 80, 88, 90, 92: display
72: dialog box
74: sub-menu
76: button
78: recording reservation screen
82: check box
84: reservation button
86: content storage

The invention claimed is:

1. A content reproduction system comprising:
a video recording apparatus for recording a content item; and
a terminal apparatus for reproducing the content item, wherein
the video recording apparatus includes:
  a content storage that stores the content item;
  a content information storage that stores content information regarding the recorded content item;
  a content distributor that distributes the content item, which is stored in the content storage, to the terminal apparatus; and
  a content information distributor that distributes the content information, which is stored in the content information storage, to the terminal apparatus,
the terminal apparatus includes:
  a display;
  an acceptor that accepts an operation of a user;
  a list storage that stores a bookmark list having content information including reproduction position information indicating a reproduction position of the content item;
  a managing controller that manages the bookmark list;
  a display controller that allows the display to display a bookmark list screen indicating a list of the content information included in the bookmark list; and
  a reproduction controller that starts reproduction of the content item from the reproduction position, which is indicated by the reproduction position information, in a case where the acceptor has accepted a user's operation of reproducing the content item, and stops the reproduction of the content item and notifies the managing controller of reproduction position update information, which indicates an updated reproduction position of the content item, in a case where the acceptor has accepted a user's operation of stopping the reproduction of the content item, and
the managing controller of the terminal apparatus:
  updates the reproduction position information, which is included in the bookmark list, based on the reproduction position update information in a case of having been notified of the reproduction position update information from the reproduction controller; and
  deletes the content information regarding the content item from the bookmark list in a case of having determined that the reproduction of the content item is finished.

2. The content reproduction system according to claim 1, wherein the managing controller of the terminal apparatus determines that the reproduction of the content item is finished in a case where a residual reproduction time of the content item is a predetermined time or less and a ratio of the residual reproduction time to a total reproduction time of the content item is a predetermined value or less at a point of time when the acceptor accepts a user's operation of stopping the reproduction of the content item.

3. The content reproduction system according to claim 1, wherein
the list storage of the terminal apparatus further stores a reproduction history list including the content information regarding the content item of which reproduction is finished, and
in a case of having determined that the reproduction of the content item is finished, the managing controller of the terminal apparatus deletes the content information regarding the content item from the bookmark list, and in addition, adds the content information to the reproduction history list.

4. The content reproduction system according to claim 1, wherein the managing controller of the terminal apparatus adds the content information regarding the content item to the bookmark list in response to that the acceptor accepts a user's operation of selecting the content item.

5. The content reproduction system according to claim 1, wherein the managing controller of the terminal apparatus adds the content information regarding the content item to the bookmark list in response to that the acceptor accepts a user's operation of selecting the content item in a state where the content item is reproduced.

6. The content reproduction system according to claim 1, wherein
in the terminal apparatus,
the display includes a touch panel,
the acceptor accepts a user's operation of selecting the content item in a case of having detected that a finger is swiped in a predetermined direction on the display from a state where the display is touched by the finger continuously for a predetermined time, and
the display controller:
  allows the display to display an icon in a case where the display is touched by the finger continuously for the predetermined time; and
  moves the icon in the predetermined direction in a case where the finger is swiped in the predetermined direction on the display in a state where the icon is displayed on the display.

7. The content reproduction system according to claim 1, wherein
the acceptor of the terminal apparatus is capable of accepting a user's operation of selecting the content item in a state where a recording reservation screen for reserving recording of the content item is displayed on the display, and the managing controller of the terminal apparatus adds the content information regarding the content item to the bookmark list in a case where a recording of the content item is completed.

8. A video recording apparatus for recording a content item,
the video recording apparatus being communicable with a terminal apparatus for reproducing the content item,
the video recording apparatus comprising:
a content storage that stores the content item;
a content information storage that stores content information regarding the recorded content item;
a content distributor that distributes the content item, which is stored in the content storage, to the terminal apparatus;
a list storage that stores a bookmark list having content information including reproduction position information indicating a reproduction position of the content item; and
a managing controller that manages the bookmark list,
wherein the managing controller:
updates the reproduction position information, which is included in the bookmark list, based on reproduction position update information, which indicates an updated reproduction position of the content item, in a case where a user's operation of stopping reproduction of the content item is accepted in the terminal apparatus; and
deletes the content information regarding the content item from the bookmark list in a case where it is determined that the reproduction of the content item is finished in the terminal apparatus.

9. A terminal apparatus for reproducing a content item, the terminal apparatus comprising:
a display;
an acceptor that accepts an operation of a user;
a list storage that stores a bookmark list having content information including reproduction position information indicating a reproduction position of the content item;
a managing controller that manages the bookmark list;
a display controller that allows the display to display a bookmark list screen indicating a list of the content information included in the bookmark list; and
a reproduction controller that starts reproduction of the content item from the reproduction position, which is indicated by the reproduction position information, in a case where the acceptor has accepted a user's operation of reproducing the content item, and stops the reproduction of the content item and notifies the managing controller of reproduction position update information, which indicates an updated reproduction position of the content item, in a case where the acceptor has accepted a user's operation of stopping the reproduction of the content item,
wherein the managing controller:
updates the reproduction position information, which is included in the bookmark list, based on the reproduction position update information in a case of having been notified of the reproduction position update information from the reproduction controller; and
deletes the content information regarding the content item from the bookmark list in a case where it is determined that the reproduction of the content item is finished.

10. A content reproduction method in a content reproduction system comprising a video recording apparatus for recording a content item and a terminal apparatus for reproducing the content item, the content reproduction method comprising:
storing the content item as a recording target in a content storage of the video recording apparatus;
storing content information regarding the recorded content item in a content information storage of the video recording apparatus;
distributing the content information, which is stored in the content information storage, from the video recording apparatus to the terminal apparatus;
storing a bookmark list, which has content information including reproduction position information indicating a reproduction position of the content item, in a list storage of the terminal apparatus;
displaying a bookmark list screen, which indicates a list of the content information included in the bookmark list, on a display of the terminal apparatus;
in a case where an acceptor of the terminal apparatus has accepted a user's operation of reproducing the content item, distributing the content item from the video recording apparatus to the terminal apparatus, and starting reproduction of the content item from a reproduction position, which is indicated by the reproduction position information;
in a case where the acceptor has accepted a user's operation of stopping the reproduction of the content item, stopping the reproduction of the content item, and updating the reproduction position information, which is included in the bookmark list, based on reproduction position update information indicating an updated reproduction position of the content item; and
deleting the content information regarding the content item from the bookmark list in a case where it is determined that the reproduction of the content item is finished.

* * * * *